(12) United States Patent
Okuzumi et al.

(10) Patent No.: US 11,079,981 B2
(45) Date of Patent: Aug. 3, 2021

(54) IMAGE FORMING APPARATUS HAVING A REPLACEMENT UNIT

(71) Applicant: CANON KABUSHIKI KAISHA, Tokyo (JP)

(72) Inventors: Ryo Okuzumi, Tachikawa (JP); Ryo Matsumura, Kawasaki (JP); Nozomu Nakajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/789,776

(22) Filed: Feb. 13, 2020

(65) Prior Publication Data

US 2020/0264818 A1    Aug. 20, 2020

(30) Foreign Application Priority Data

Feb. 20, 2019   (JP) .............................. JP2019-028164
Jan. 10, 2020   (JP) .............................. JP2020-002728

(51) Int. Cl.
*G03G 21/16*   (2006.01)
*G06F 3/12*    (2006.01)
*G03G 15/20*   (2006.01)

(52) U.S. Cl.
CPC ......... *G06F 3/1231* (2013.01); *G03G 15/205* (2013.01); *G03G 2215/00324* (2013.01)

(58) Field of Classification Search
CPC .... G03G 15/20; G03G 15/75; G03G 15/0105; G03G 15/0136; G06F 2212/7204
USPC ........ 358/3.23, 3.32, 1.13, 1.15; 399/12, 11, 399/24
See application file for complete search history.

(56) References Cited

U.S. PATENT DOCUMENTS

| 7,197,256 B2 | 3/2007  | Nishizaki |
| 7,460,795 B2 | 12/2008 | Kimura    |
| 9,171,241 B2 | 10/2015 | Nakajima  |

(Continued)

FOREIGN PATENT DOCUMENTS

| JP | H11-305579  | 11/1999 |
| JP | 2000-172133 | 6/2000  |

(Continued)

OTHER PUBLICATIONS

U.S. Appl. No. 16/859,139, filed Apr. 27, 2020 by Taro Minobe et al.

*Primary Examiner* — Jamares Q Washington
(74) *Attorney, Agent, or Firm* — Venable LLP

(57) ABSTRACT

The image forming apparatus includes a main assembly, a replacement unit detachably mounted on the main assembly, an identification unit configured to identify whether the replacement unit is a first unit mounted in advance in a shipment state of the image forming apparatus or is a second unit after replacement, a common signal line configured to transmit a signal from the identification unit and another signal; a memory unit mounted on the main assembly and configured to store control information for the first unit, and a control unit configured to control the first unit based on the control information of the first unit, wherein the control unit is switchable between an identification mode and a normal operation mode, and wherein the control unit switches control information of the replacement unit mounted on the main assembly depending on whether the replacement unit is the first unit or the second unit.

18 Claims, 14 Drawing Sheets

(56) References Cited

U.S. PATENT DOCUMENTS

| | | | |
|---|---|---|---|
| 9,329,561 B2 | 5/2016 | Hayasaki | |
| 9,391,443 B2 | 7/2016 | Nakajima | |
| 2002/0028080 A1* | 3/2002 | Naito | G03G 15/55 399/12 |
| 2003/0031476 A1* | 2/2003 | Takeuchi | G03G 15/65 399/16 |
| 2005/0008406 A1 | 1/2005 | Nishizaki | |
| 2005/0254839 A1* | 11/2005 | Nagamine | G03G 15/556 399/12 |
| 2006/0133835 A1* | 6/2006 | Kimura | G03G 21/1889 399/53 |
| 2009/0279905 A1* | 11/2009 | Zensai | G03G 21/1642 399/12 |
| 2018/0231932 A1 | 8/2018 | Minobe | |
| 2018/0238937 A1 | 8/2018 | Nakajima | |

FOREIGN PATENT DOCUMENTS

| | | |
|---|---|---|
| JP | 2005-17422 | 1/2005 |
| JP | 2006-145765 | 6/2006 |
| JP | 2015-72345 | 5/2015 |

\* cited by examiner

IMAGE FORMING APPARATUS HAVING A REPLACEMENT UNIT

BACKGROUND OF THE INVENTION

Field of the Invention

The present invention relates to an image forming apparatus such as a laser printer.

Description of the Related Art

Conventionally, among image forming apparatuses such as laser printers, models are available in which a memory is mounted in a unit (for example, a fixing apparatus) constituting a part of an image forming unit that carries out image formation, and information required for control is stored in the mounted memory (Japanese Patent Application Laid-Open No. H11-305579). FIG. 14 is a schematic diagram illustrating the configuration of such kind of image forming apparatus. The image forming apparatus illustrated in FIG. 14 includes a fixing device 1401, and an ECU (control unit) 1404 connected to the fixing device 1401 and that controls the fixing device 1401. The fixing device 1401 has a heating unit 1403 and a memory 1402 constituted by an EEPROM or the like. A heater resistance value and a current conducting time and the like are stored in the memory 1402. On the other hand, the ECU 1404 includes a CPU 1405 that controls the fixing device 1401, and an AC unit 1006 that supplies electric power to the heating unit 1403 of the fixing device 1401. The CPU 1405 performs control of the heating unit 1403 based on control information with respect to the fixing device 1401 stored in the memory 1402, and performs processing to predict the life of the fixing device 1401 and the image forming apparatus main assembly and the like. In recent years, there are demands for further energy savings and also for increased image quality of images obtained by image formation and the like. For example, an image forming apparatus which has a configuration in which a memory is mounted in all of the units for performing image formation, and information required for control is stored beforehand in each of the memories so that optimal control is performed has been made commercially available. In such kind of image forming apparatus, the characteristics of the manufactured units are measured, the characteristics information measured is stored in advance in the memory 1402, and when performing image formation the characteristics information is acquired from the memory 1402 and is reflected in image formation control so that an image of high quality can be provided.

However, in a case where a memory such as an EEPROM is mounted in units constituting the aforementioned image forming unit, the cost incurred for mounting the memories is large. Therefore, a method is also conceivable in which a memory is not mounted in each unit (for example, the fixing device 1401) and instead, when performing assembly of the image forming apparatus main assembly, information for the fixing device 1401 is stored in advance in the CPU 1405 or in a nonvolatile memory different from the memory of the fixing device 1401. However, in a case where a unit is replaced, the information of the newly mounted unit after the replacement and the information of the unit mounted prior to the replacement stored in the nonvolatile memory do not match, and optimal control cannot be performed based on the information stored in the nonvolatile memory. Therefore, it is necessary to detect whether a unit is a unit mounted in a main assembly shipment state or is a unit mounted as a replacement, and to switch control accordingly. In order to perform detection regarding whether a unit is a unit mounted in a main assembly shipment state or is a unit mounted as a replacement, it is necessary to add a dedicated signal line, and this affects the cost and size of the main assembly.

SUMMARY OF THE INVENTION

One aspect of the present invention is an image forming apparatus which has been made in view of the above-described circumstances and which, with a simple configuration, detects whether a unit is a unit mounted in a main assembly shipment state or is a unit mounted as a replacement, and performs optimal control according to the detection result.

Another aspect of the present invention is an image forming apparatus configured to form an image on a sheet, the image forming apparatus including a main assembly of the image forming apparatus, a replacement unit detachably mounted on the main assembly, an identification unit configured to identify whether the replacement unit is a first unit mounted in advance in a shipment state of the image forming apparatus, or is a second unit after replacement, a common signal line configured to transmit a signal from the identification unit and another signal, a memory unit mounted on the main assembly, the memory unit configured to store control information for the first unit, and a control unit configured to control the first unit based on the control information for the first unit, wherein the control unit is switchable between an identification mode in which the identification unit identifies whether the replacement unit is the first unit or the second unit and a normal operation mode in which the image forming apparatus performs a normal operation according to a signal from the identification unit through the common signal line, and wherein the control unit switches control information of the replacement unit mounted on the main assembly depending on whether the replacement unit identified in the identification mode is the first unit or is the second unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

[Configuration of Image Forming Apparatus]

Figure 1:
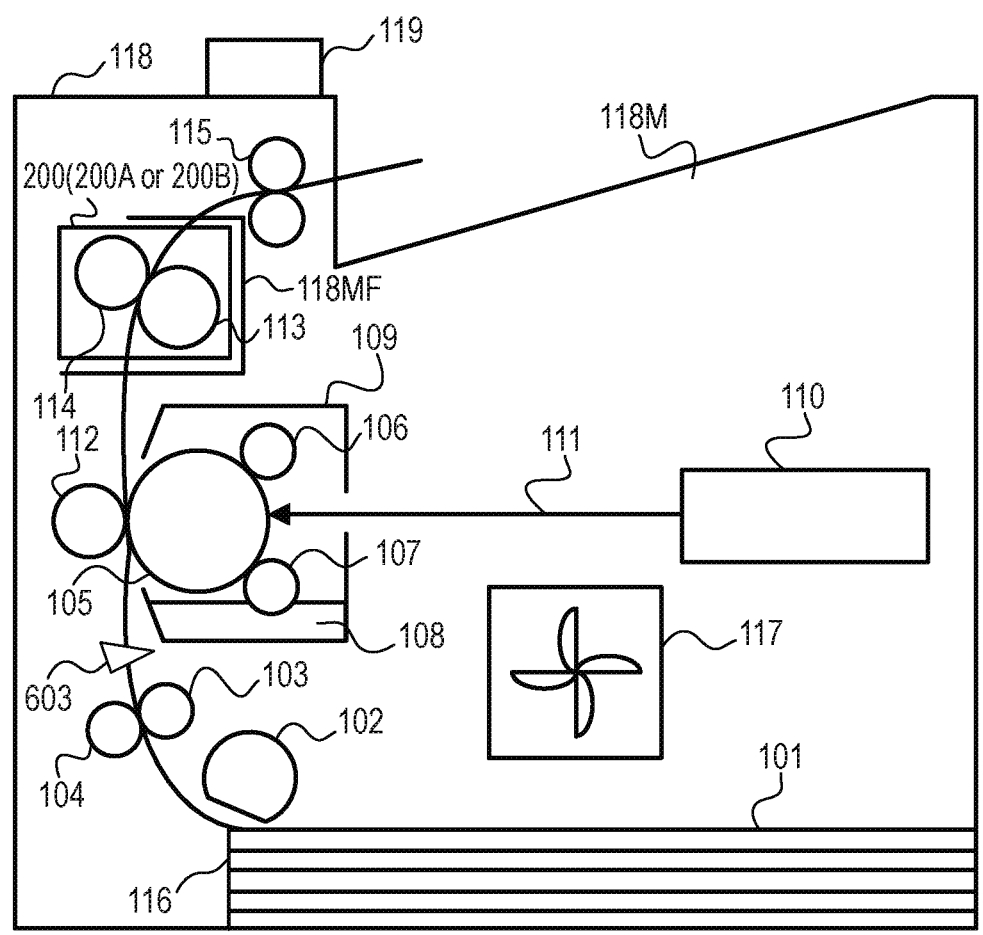
FIG. 1 is a schematic cross-sectional view illustrating the configuration of a laser printer of Embodiments 1 to 4.

FIG. 1 is a schematic cross-sectional view illustrating the configuration of a laser printer 118 configured to form monochrome images that is an image forming apparatus to which Embodiment 1 is applied. Hereunder, the configuration and image forming operations of the laser printer 118 are described. Reference character 118M denotes a main assembly of the image forming apparatus.

Upon the start of a print (image formation) operation, the laser printer 118 picks up a single paper (also referred to as a "sheet") 101 that is a recording medium which is loaded in a sheet feeding unit 116, by a sheet feeding roller 102. The paper 101 picked up is conveyed along a conveyance path by a conveyance roller pair 103 and 104. When conveyance of the paper 101 is started, the leading edge and trailing edge of the paper 101 in the conveyance direction are detected by a mechanical flag 603 that is a sheet passing detection flag of a top sensor 601 (described later) configured to detect the paper 101 conveyed along the conveyance path. The timing at which a transfer roller 112 starts the transfer of a toner image onto the paper 101 (onto the sheet) is determined according to detection of the leading edge of the paper 101 by the top sensor 601.

A process cartridge 109 includes a photosensitive drum 105 that is an image bearing member, a charge roller 106, a developing roller 107, and toner 108 for developing an electrostatic latent image on the photosensitive drum 105 (on the image bearing member). Upon the start of a print operation, a high voltage is applied to the charge roller 106, and the surface of the photosensitive drum 105 is charged to a uniform potential by the charge roller 106. Thereafter, by scanning laser light 111 emitted from an optical scanning device 110 on the photosensitive drum 105, an electrostatic latent image is formed on the photosensitive drum 105. Further, by a high voltage applied to the developing roller 107, the toner 108 adheres to the electrostatic latent image formed on the photosensitive drum 105, to thereby form a toner image. Thereafter, by application of a high voltage to the transfer roller 112, the toner image formed on the photosensitive drum 105 is transferred onto the paper 101 conveyed from the sheet feeding unit 116. The paper 101 onto which the toner image was transferred is heated and pressed while being conveyed while being pinched between a heating unit 113 and a pressure unit 114 of a fixing device 200 (a starter fixing device (first unit) 200A or a fixing device for maintenance (second unit) 200B that will be described later), to thereby fix the toner image on the paper 101. The paper 101 on which the toner image was fixed is then discharged to outside of the laser printer 118 by discharging rollers 115 to thereby complete the print (image formation) operation. The fixing device 200 is detachably mounted on the main assembly 118M. The fixing device 200 is mounted on a receiving unit 118MF provided in the main assembly 118M.

Note that, in the case of continuously performing printing (image formation), the top sensor 601 can determine the timing at which to start conveyance of the next paper 101 from the sheet feeding unit 116 based on detection of passage of the trailing edge of the paper 101 in the conveyance direction by the mechanical flag 603. The laser printer 118 also includes a fan 117. The fan 117 is provided to prevent the toner 108 in the process cartridge 109 from sticking due to heat generation of the heating unit 113 of the fixing device 200, and to suppress heat generation by electrical components such as a power supply device (not illustrated). In addition, at an upper part of the laser printer 118, an operation unit 119 is provided that includes a display unit for displaying information to a user or a service person and a keypad for inputting data or various instructions.

[Configuration of Fixing Device]

Figure 2A:
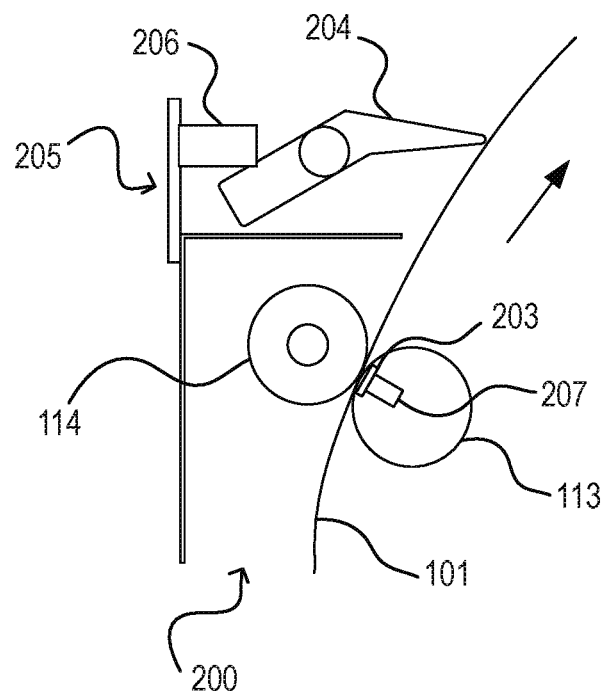
FIG. 2A and FIG. 2B are schematic cross-sectional views illustrating the configuration of a fixing device of Embodiments 1, 3 and 4.
Figure 2B:
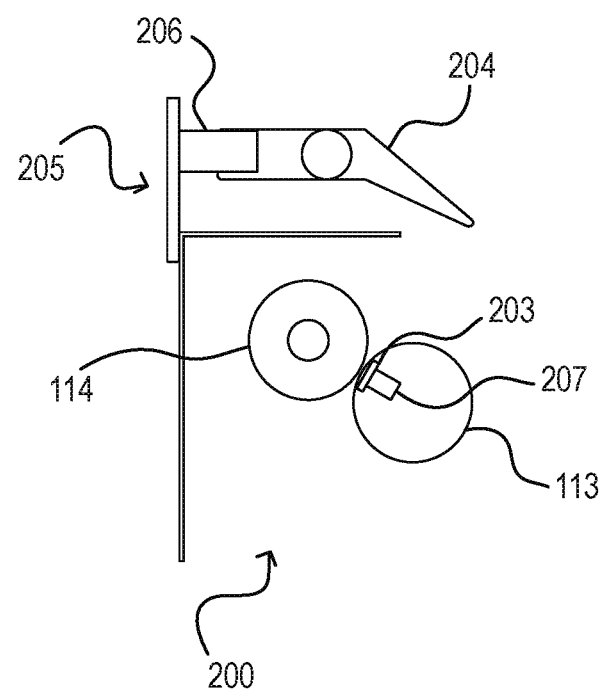

FIG. 2A and FIG. 2B are schematic cross-sectional views illustrating the configuration of the fixing device 200. FIG. 2A is a view that illustrates a state when the paper 101 is passing through the fixing device 200, and FIG. 2B is a view that illustrates a state when the paper 101 is not passing through the fixing device 200. As illustrated in FIG. 2A and FIG. 2B, the heating unit 113 configured to heat the paper 101, and the pressure unit 114 configured to press the paper 101 passing through a nip portion between the pressure unit 114 and the heating unit 113, are disposed inside the fixing device 200. The heating unit 113 and the pressure unit 114 are held by a metal plate (not illustrated) or the like provided at both ends of the fixing device 200. A gear (not illustrated) is attached to the pressure unit 114, and the pressure unit 114 is driven to rotate by a motor (not illustrated). A heater 203 configured to overheat the paper 101 passing through the fixing device 200, and a temperature detection element 207 configured to measure the temperature of the heater 203 are disposed inside the heating unit 113. The heater 203 is disposed at a position facing the pressure unit 114. The temperature detection element 207 is disposed at a position contacting a rear face of the heater 203 that is a position on the opposite side to the face that faces the pressure unit 114 of the heater 203. The heater 203 is heated by input of an alternating-current voltage, and temperature control is performed based on a temperature detection result with respect to the heater 203 that is obtained by the temperature detection element 207.

A sheet-discharging sensor 205 configured to detect a sheet passing state of the paper 101 (a state in which the paper 101 is passing through the fixing device 200) is mounted on the fixing device 200. The sheet-discharging sensor 205 is constituted by a photo-interrupter 206 and a mechanical flag 204 which are mounted on a base plate of the sheet-discharging sensor 205. The photo-interrupter 206 includes a light emitting unit configured to emit a light beam through a slit into which the mechanical flag 204 moves according to the sheet passing state of the paper 101, and a light receiving unit configured to detect the light beam emitted from the light emitting unit. In a case where the mechanical flag 204 has entered the slit, a state is entered in which the light beam from the light emitting unit is blocked by the mechanical flag 204 and consequently the light receiving unit cannot detect the light beam. On the other hand, in a case where the mechanical flag 204 has left from the slit, the light beam from the light emitting unit is not blocked by the mechanical flag 204, and therefore a light-transmission state is entered in which the light beam can be detected by the light receiving unit.

FIG. 2A is a view illustrating a state in which the paper 101 is passing through the inside of the fixing device 200. When the paper 101 passes through the fixing device 200, the paper 101 pushes up one end of the mechanical flag 204 and thereby causes the other end of the mechanical flag 204 to move and leave from the slit in the photo-interrupter 206. Consequently, because the light beam emitted from the light emitting unit of the photo-interrupter 206 is detected by the light receiving unit, the sheet-discharging sensor 205 can detect that the paper 101 is in the process of passing through (or is stagnant) inside the fixing device 200. On the other hand, FIG. 2B is a view illustrating a state in which the paper 101 is not inside (not passing through) the fixing device 200. In this case, because one end of the mechanical flag 204 is not pushed up by the paper 101, the state is one in which the other end of the mechanical flag 204 stays inside the slit of the photo-interrupter 206. As a result, the light beam emitted from the light emitting unit of the photo-interrupter 206 is blocked by the mechanical flag 204, and the light receiving unit cannot detect the light beam. Thus, the sheet-discharging sensor 205 can detect that the paper 101 is not in the process of passing through (or is not stagnant) inside the fixing device 200.

[Configuration and Control of Fixing Device and ECU]

Figure 3:
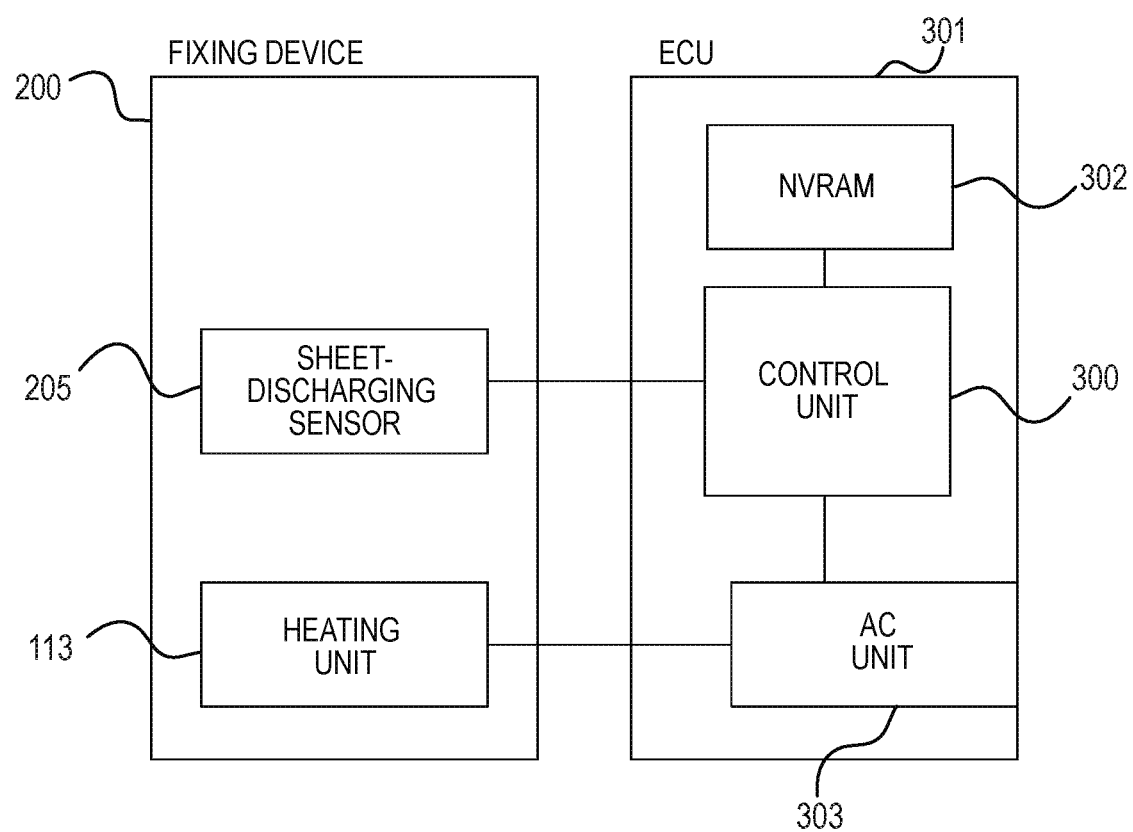
FIG. 3 is a block diagram for describing the configuration of the fixing device and an ECU of Embodiment 1.

FIG. 3 is a view for describing the configuration and control of the fixing device 200 and an Engine Control Unit (ECU) 301 configured to control each unit of the laser printer 118. As described previously, the sheet-discharging sensor 205 and the heating unit 113 are mounted in the fixing device 200. In FIG. 3, diagrammatic illustration of portions of the apparatus that are not electrically involved such as the pressure unit 114 is omitted. The ECU 301 includes: a control unit 300 for controlling the fixing device 200 and actuators (not illustrated) and the like; an NVRAM 302 that is a nonvolatile memory as a memory unit (first memory unit); and an AC unit 303 configured to perform operations to supply power to the ECU 301 and the respective units. The control unit 300 accesses the NVRAM 302 by communication by I2C, and performs reading of data stored in the NVRAM 302 and writing of data to the NVRAM 302. Further, the AC unit 303 supplies an alternating-current voltage input from an inlet (not illustrated) to the heating unit 113, generates a direct-current voltage from the alternating-current voltage input, and supplies the direct-current voltage to the control unit 300 and devices of the respective units. The supply of power to the heating unit 113 is performed by the AC unit 303, and control of the power supply to the heating unit 113 is performed by the control unit 300.

[Temperature Control of Heating Unit]

In the fixing device 200, due to variations between components when manufacturing the heating unit 113 or the pressure unit 114 and variations between forces applied when assembling the components and the like, individual differences sometimes arise with respect to the fixing performance when fixing a toner image to the paper 101. Conventionally, taking into consideration such variations that occur at the time of manufacture, the temperature of the heater 203 has been set according to the fixing performance of the fixing device 200 with the most inferior fixing performance, and consequently some cases have sometimes occurred where, depending on the fixing device 200, electric power was supplied in an amount greater than the required amount. Therefore, energy saving can be realized in the fixing device 200 if a configuration is adopted which corrects the setting temperature so as to be the optimal temperature setting for the heater 203 according to the fixing performance of the individual fixing device 200.

Therefore, a table (Table 1) in which correction levels determined based on the correlation between characteristics data and the fixing performance of the fixing device 200, and correction values for the temperature of the heater 203 that correspond to the correction levels are associated is created in advance, and stored in the NVRAM 302 of the ECU 301. In this case, the term "characteristics data" refers to data (temperature characteristics) regarding the period of time required until the temperature detection element 207 disposed inside the fixing device 200 becomes a predetermined temperature when a predetermined electric power is supplied to the fixing device 200. Further, the term "fixing performance" refers to the ease with which toner peels off from the paper 101 when a toner image was fixed to the paper 101. The aforementioned characteristics data is acquired when manufacturing the fixing device 200, a correction level is determined based on the acquired characteristics data, and the determined correction level is displayed, for example, on a barcode or a label of the fixing device 200. Thereafter, when assembling the fixing device 200 in the laser printer 118, the correction level displayed on the barcode or label or the like on the fixing device 200 is written into the NVRAM 302 of the ECU 301. By this means, the control unit 300 can acquire the correction level of the fixing device 200 from the NVRAM 302 when performing image formation onto the paper 101, and can acquire a corresponding correction value from the acquired correction level and the table (Table 1) stored in the NVRAM 302. As a result, the control unit 300 can cause the characteristics data of the fixing device 200 to be reflected in the setting of the temperature information of the heater 203.

Table 1 is one example of the aforementioned table in which correction levels and correction values are associated. Table 1 shows correction levels (10 levels from 0 to 9), and correction values from 0 to −9 that correspond to the correction levels. The correction values are set so that the relevant heater 203 becomes the optimal temperature (180° C. to 171° C.) by adding the relevant correction value to a standard temperature 180° C. in the case of performing correction of the heater 203. For example, in a case where the correction level of the fixing device 200 is "3", a correction value of −3° C. is added to the setting temperature of 180° C. which is the default setting that corresponds to a correction level 0 at which correction is not required, and thus the temperature becomes 177° C. (=180° C.−3° C.). Note that, although in this case the setting temperature of the heater 203 of the fixing device 200 is taken as the correction object, the correction object is not limited to the fixing temperature.

TABLE 1

| Correction Level | Correction Value | Example |
| --- | --- | --- |
| 0 | 0 | 180° C. |
| 1 | −1 | 179° C. |
| 2 | −2 | 178° C. |
| 3 | −3 | 177° C. |
| 4 | −4 | 176° C. |
| 5 | −5 | 175° C. |
| 6 | −6 | 174° C. |
| 7 | −7 | 173° C. |
| 8 | −8 | 172° C. |
| 9 | −9 | 171° C. |

In this connection, the fixing device 200 is a replaceable consumable (replacement unit). Therefore, in some cases, due to a reason such as the device lifetime expiring or a device failure after shipment of the product, a starter fixing device (first unit) 200A mounted in advance in the shipment state of the printer 118 is replaced with a fixing device for maintenance (second unit) 200B. The aforementioned setting of a correction level in the NVRAM 302 is performed when assembling the starter fixing device 200A in the laser printer 118 at the factory. Therefore, in some cases the correction level of the starter fixing device 200A that is stored in the NVRAM 302 and the correction level of the fixing device for maintenance 200B newly mounted as a result of replacing the starter fixing device 200A do not match. Further, accompanying replacement of the starter fixing device 200A with the fixing device for maintenance 200B, in order to change the correction level set in the NVRAM 302 so as to correspond with the correction level of the fixing device for maintenance 200B mounted as a replacement, it is necessary to access the base plate on which the control unit 300 is mounted and to communicate with the control unit 300. Therefore, it is difficult to write a new correction level in the NVRAM 302. Consequently, to perform temperature control of the heater 203 of the fixing device for maintenance 200B, it is necessary to distinguish whether the mounted fixing device 200 is the starter fixing device 200A for which a correction level was set in the NVRAM 302 or is the fixing device for maintenance 200B for which a correction level has not been set in the NVRAM 302. In a case where the mounted fixing device 200 is the fixing device for maintenance 200B, it is necessary to make the setting temperature of the heater 203 the default value (a common value for second units that does relate to individual differences of the fixing device for maintenance 200B=common control information for the second unit), and ensure that a decrease in image quality or the like does not occur irrespective of individual differences of the fixing device for maintenance 200B.

[Distinguishing the Fixing Device]

Figure 4A:
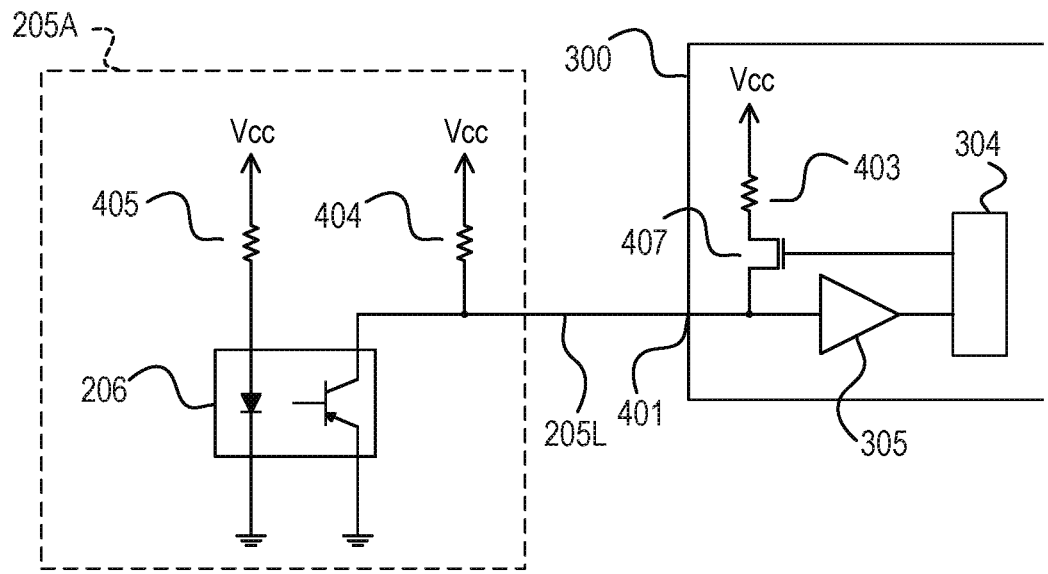
FIG. 4A and FIG. 4B are views for describing connections between the fixing device and a control unit in Embodiments 1 and 3.
Figure 4B:
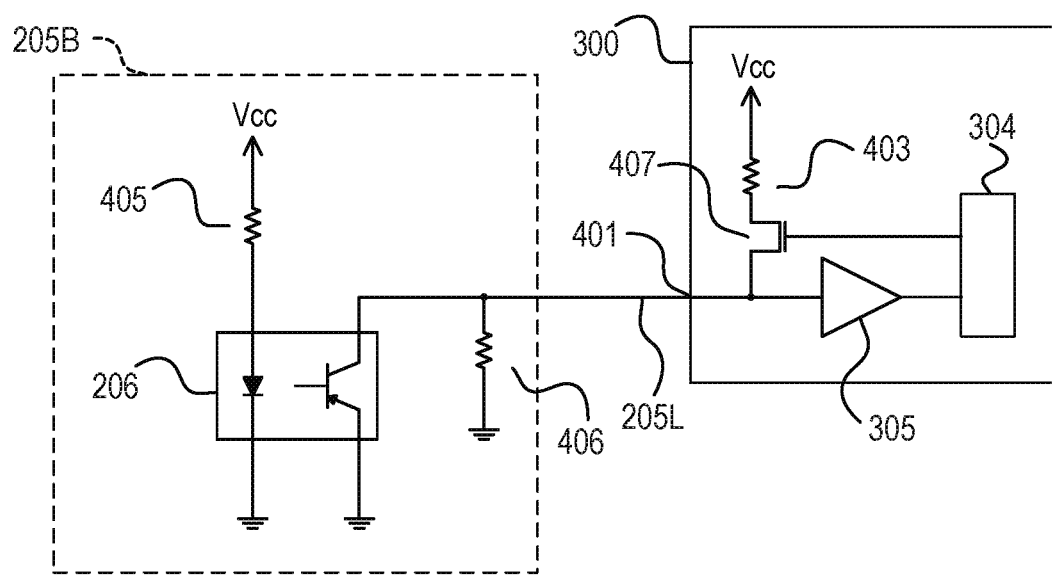

FIG. 4A and FIG. 4B are views for describing the configuration of the sheet-discharging sensor 205 mounted in the fixing device 200 and the control unit 300 of the ECU 301, and also connections between the sheet-discharging sensor 205 and the control unit 300. FIG. 4A is a view illustrating a connection between the control unit 300 and a sheet-discharging sensor 205A of the starter fixing device 200A mounted when the laser printer 118 was shipped. On the other hand, FIG. 4B is a view illustrating a connection between the control unit 300 and a sheet-discharging sensor 205B of the fixing device for maintenance 200B which was mounted as a replacement due to the device lifetime expiring or the like.

The control unit 300 has an input port 401 into which a signal from the sheet-discharging sensor 205A of the fixing device 200A or the sheet-discharging sensor 205B of the fixing device 200B is input through a common signal line 205L. The input port 401 is connected to a buffer 305, and the buffer 305 outputs the signal input, to a CPU 304 that is a control unit. The input port 401 is connected to one end of a switch 407 which is subjected to on-off control by the CPU 304. The other end of the switch 407 is connected to one end of a resistor 403. The other end of the resistor 403 is pull-up connected to a power supply voltage Vcc. When the CPU 304 turns on the switch 407, the input port 401 is pull-up connected to the power supply voltage Vcc through the resistor 403. On the other hand, when the CPU 304 turns off the switch 407, the connection between the input port 401 and the resistor 403 is cut off. The switch 407 is a semiconductor switch such as a transistor or a field effect transistor (FET). In a case where the switch 407 is a transistor, the CPU 304 performs on-off control by controlling the voltage to the base terminal. In a case where the switch 407 is an FET, the CPU 304 performs on-off control by controlling the voltage to the gate terminal.

The sheet-discharging sensor 205A of the starter fixing device 200A includes the photo-interrupter 206 mounted on a base plate of the sheet-discharging sensor 205A, and a resistor 404 for identification that is an identification unit for specifying the starter fixing device 200A. The sheet-discharging sensor 205B of the fixing device for maintenance 200B includes the photo-interrupter 206 mounted on a base plate of the sheet-discharging sensor 205B, and a resistor 406 for identification that is an identification unit for specifying the fixing device for maintenance 200B. Note that, the resistor 404 is mounted on the base plate of the sheet-discharging sensor 205A of the starter fixing device 200A. On the other hand, the resistor 406 is mounted on the base plate of the sheet-discharging sensor 205B of the fixing device for maintenance 200B.

The photo-interrupter 206 includes a light emitting diode (hereunder, referred to as "LED") that is a light emitting unit, and a phototransistor that is a light receiving unit configured to detect a light beam from the LED. Furthermore, a slit (not illustrated in FIG. 4A and FIG. 4B) is provided between the LED and the phototransistor, and the photo-interrupter 206 is configured so that the mechanical flag 204 (not illustrated in FIG. 4A and FIG. 4B) moves through the slit according to the state of the paper 101 that passes through the fixing device 200. An anode terminal of the LED of the photo-interrupter 206 is connected to the power supply voltage Vcc through a resistor 405, and hence the LED is always in a conducting state. Further, in the case of a light-transmission state in which the mechanical flag 204 is not present in the slit, the phototransistor of the photo-interrupter 206 enters an "turn-on" state because the phototransistor receives the light beam from the LED. On the other hand, in the case of a light-shielded state in which the mechanical flag 204 has entered the slit, the phototransistor of the photo-interrupter 206 enters an "turn-off" state because the light beam from the LED is blocked by the mechanical flag 204.

The collector terminal of the phototransistor of the photo-interrupter 206 is the output terminal of an open collector, and is connected to the input port 401 of the control unit 300. Further, one end of the resistor 404 of the sheet-discharging sensor 205A of the starter fixing device 200A mounted in the shipment state described above is connected to the collector terminal of the phototransistor of the photo-interrupter 206, and the other end of the resistor 404 is pull-up connected to the power supply voltage Vcc (FIG. 4A). On the other hand, one end of the resistor 406 of the sheet-discharging sensor 205B of the fixing device for maintenance 200B is connected to the collector terminal of the phototransistor of the photo-interrupter 206, and the other end of the resistor 406 is pull-down connected to a ground (GND) (FIG. 4B). Note that, in the present embodiment, the resistance values of the resistors 404 and 406 are made resistance values which are sufficiently larger than the resistance value of the resistor 403 of the control unit 300.

[Paper Detection Mode and Identification Mode]

Next, a method through which the CPU 304 determines whether the fixing device 200 is the starter fixing device 200A or the fixing device for maintenance 200B based on a signal that is input from the input port 401 through the buffer 305, and a method through which the CPU 304 detects whether or not the paper 101 is passing through the fixing device 200 will be described. First, a method through which the CPU 304 determines whether or not the current state is a state in which the paper 101 is passing through the fixing device 200 based on a signal level input to the input port 401 from the sheet-discharging sensor 205 will be described. In this case, by turning on the switch 407, the CPU 304 sets the input port 401 in a state in which the input port 401 is pull-up connected to the power supply voltage Vcc through the resistor 403.

In a case where the fixing device 200 illustrated in FIG. 4A is the starter fixing device 200A mounted in the product shipment state, because the resistor 404 is pull-up connected to the power supply voltage Vcc, the resistance value with respect to the input signal to the input port 401 becomes the combined resistance for a case where the resistor 404 and the resistor 403 are connected in parallel. On the other hand, in a case where the fixing device 200 is the fixing device for maintenance 200B as illustrated in FIG. 4B, because the resistor 406 is pull-down connected to the ground (GND), the voltage value of an input signal to the input port 401 is a voltage obtained when the power supply voltage Vcc is divided by the resistor 403 and the resistor 406. At this time, because the resistor 406 has a sufficiently larger resistance value than the resistor 403, a threshold value for a "high" level and a "low" level with respect to the CPU 304 can be satisfied. According to this configuration, in a case where a signal level input to the input port 401 is the "high" level (first signal), because the phototransistor of the photo-interrupter 206 is in an "turn-off" state, the CPU 304 determines that the paper 101 is not inside (not stagnant inside) the fixing device 200. On the other hand, in a case where the signal level input from the input port 401 is the "low" level (second signal), because the phototransistor of the photo-interrupter 206 is in an "turn-on" state, the CPU 304 determines that the paper 101 is passing through (is stagnant inside) the fixing device 200.

Next, a method through which the CPU 304 determines whether the fixing device 200 is the starter fixing device 200A or the fixing device for maintenance 200B based on the signal level input to the input port 401 from the sheet-discharging sensor 205 will be described. In this case, by turning off the switch 407, the CPU 304 cuts off the connection between the input port 401 and the resistor 403 to thereby set so that a state is not entered in which the input port 401 is pull-up connected to the power supply voltage Vcc through the resistor 403. At this time, in a case where the paper 101 is passing through (or stagnant inside) the fixing device 200, the phototransistor of the photo-interrupter 206 is in an "turn-on" state, and the input signal to the input port 401 of the control unit 300 is fixed in the "low" level state. As a result, a determination as to whether the fixing device 200 is the starter fixing device 200A mounted in the product shipment state or is the fixing device for maintenance 200B cannot be correctly performed. Therefore, in a case where the CPU 304 determines whether the fixing device 200 is the fixing device 200A or the fixing device 200B based on the signal level input to the input port 401 from the sheet-discharging sensor 205, the determination must be performed in a state in which the paper 101 is not present (is not stagnant) inside the fixing device 200. In a case where the CPU 304 determines that the signal level at the input port 401 in a state in which the paper 101 is not present (is not stagnant) inside the fixing device 200 is the "high" level (first signal), it means that the sheet-discharging sensor 205 includes the resistor 404. Therefore, the CPU 304 determines that the fixing device 200 is the starter fixing device 200A mounted in the product shipment state. On the other hand, in a case where the CPU 304 determines that the signal level at the input port 401 in a state in which the paper 101 is not present (is not stagnant) inside the fixing device 200 is the "low" level (second signal), it means that the sheet-discharging sensor 205 includes the resistor 406. Therefore, the CPU 304 determines that the fixing device 200 is the fixing device for maintenance 200B.

As described above, in the case of determining whether the fixing device 200 is the fixing device 200A or the fixing device 200B, the CPU 304 sets the switch 407 to the "turn-off" state, and in the case of determining whether the paper 101 is passing through the fixing device 200, the CPU 304 sets the switch 407 to the "turn-on" state. Thus, it can also be said that the switch 407 is a changeover switch configured to switch between an "identification mode" configured to identify the fixing device 200 and a "paper detection mode" configured to detect whether or not the paper 101 is passing through the fixing device 200. Note that, when setting the "identification mode", it is necessary for the state to be one in which the paper 101 is not passing through the inside of the fixing device 200, or in which the paper 101 is not stagnant inside the fixing device 200.

Note that, although in the present embodiment the resistor 404 is pull-up connected to the power supply voltage Vcc, and the resistor 406 is connected to the ground (GND), a configuration may also be adopted in which, for example, the resistor 404 is connected to the ground (GND), and the resistor 406 is pull-up connected to the power supply voltage Vcc. In this case, if the signal level at the input port 401 is the "low" level, it is determined that the fixing device 200 is the starter fixing device 200A of the product shipment state, and if the signal level at the input port 401 is the "high" level, it is determined that the fixing device 200 is the fixing device for maintenance 200B.

[Control Sequence for Distinguishing Fixing Device]

Figure 5:
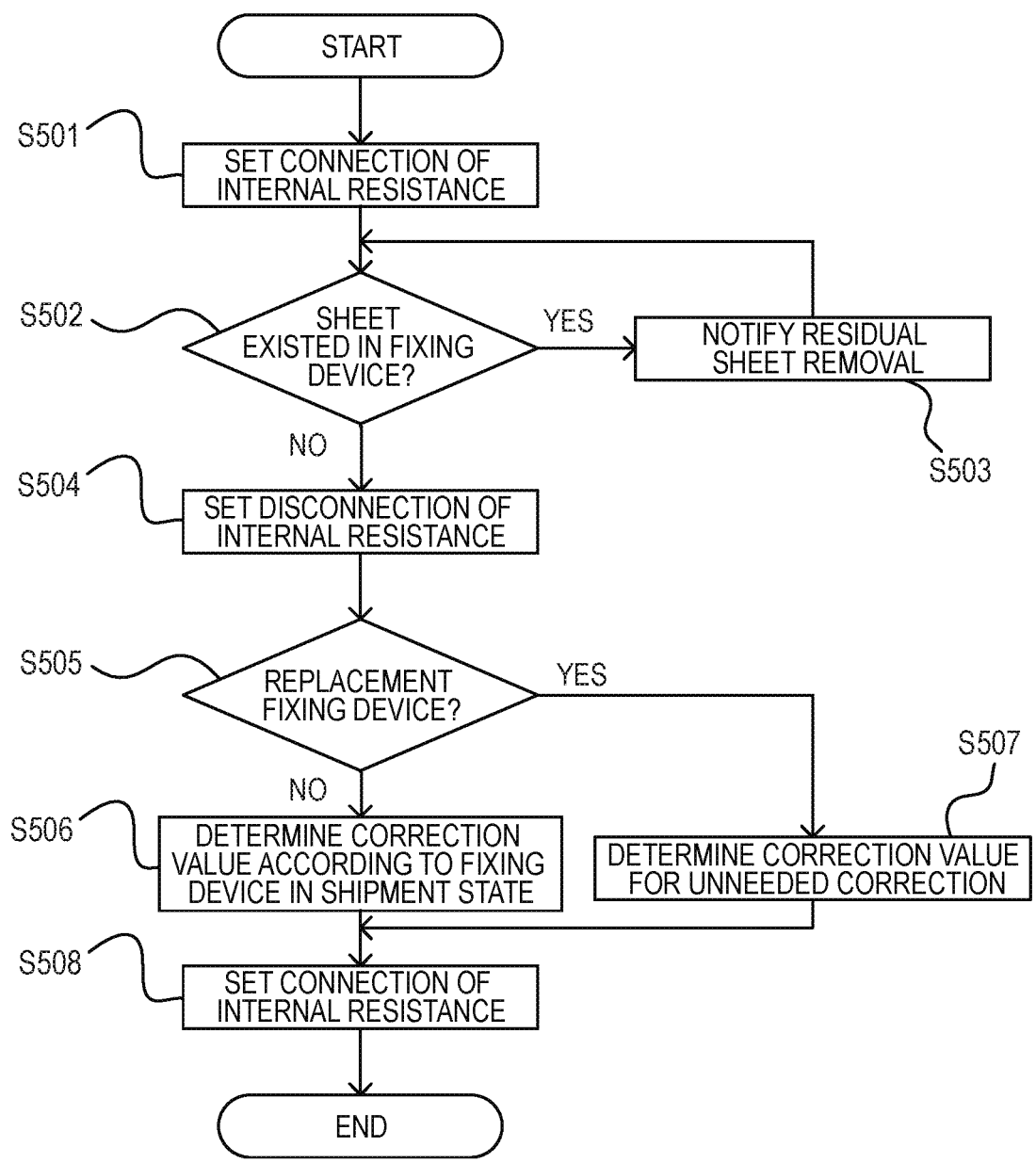
FIG. 5 is a flowchart illustrating a control sequence for distinguishing the fixing device of Embodiment 1.

FIG. 5 is a flowchart illustrating a control sequence for distinguishing whether the fixing device 200 mounted in the laser printer 118 is the fixing device 200A of the product shipment state or is the fixing device for maintenance 200B. The processing illustrated in FIG. 5 is activated when the power of the laser printer 118 is turned on, and is executed by the CPU 304. Note that, it is assumed that a correction level of the starter fixing device 200A mounted in the product shipment state and a table in which correction levels of the fixing device 200A and correction values for the setting temperature of the heater 203 are associated are stored in advance in the NVRAM 302 of the control unit 300.

In step (hereunder, abbreviated as "S") 501, in order to determine whether or not the paper 101 remains inside the fixing device 200, the CPU 304 sets the switch 407 to the "turn-on" state to thereby set the aforementioned paper detection mode. Further, when the CPU 304 sets the switch 407 to the "turn-on" state, the input port 401 is pull-up connected to the power supply voltage Vcc through the resistor 403 that is an internal resistance (set connection of internal resistance). In S502, the CPU 304 determines whether or not the paper 101 remains inside the fixing device 200 based on an output signal from the sheet-discharging sensor 205 of the fixing device 200 input to the input port 401. If the input signal to the input port 401 is the "low" level, the CPU 304 determines that the paper 101 remains inside the fixing device 200, and advances the processing to S503. On the other hand, if the input signal to the input port 401 is the "high" level, the CPU 304 determines that the paper 101 does not remain inside the fixing device 200, and advances the processing to S504. In S503, the CPU 304 displays a message to prompt removal of the residual paper 101 on the display unit of the operation unit 119 so that a user or the like removes the paper (jammed paper) 101 remaining inside the fixing device 200, and then returns the processing to S502. Note that, for example, in a case where the laser printer 118 has a function configured to automatically discharge paper that remains in the fixing device 200, the CPU 304 may perform processing to activate the discharge function and discharge the residual paper 101 from the inside of the fixing device 200.

In S504, to determine whether or not the fixing device 200 mounted is the starter fixing device 200A or the fixing device for maintenance (fixing device for service) 200B, the CPU 304 sets the switch 407 to the "turn-off" state, to thereby switch from the aforementioned paper detection mode to the identification mode. By setting the switch 407 to the "turn-off" state, the CPU 304 cuts off (disconnects) the connection between the input port 401 and the resistor 403 (internal resistance) (set disconnection of internal resistance). In S505, the CPU 304 determines whether the fixing device 200 is the fixing device 200A or the fixing device 200B based on the output signal from the sheet-discharging sensor 205 of the fixing device 200 input to the input port 401. If the output signal from the sheet-discharging sensor 205 of the fixing device 200 input to the input port 401 is the "low" level, the CPU 304 determines that the fixing device 200 is the replacement fixing device 200B, and advances the processing to S507. On the other hand, if the output signal from the sheet-discharging sensor 205 of the fixing device 200 input to the input port 401 is the "high" level, the CPU 304 determines that the fixing device 200 is not the replacement fixing device 200B (is the fixing device 200A mounted in the shipment state), and advances the processing to S506.

In S506, since the fixing device 200 mounted is the starter fixing device 200A mounted in the shipment state, the CPU 304 acquires the correction level of the starter fixing device 200A from the NVRAM 302. Further, the CPU 304 determines the corresponding correction value based on the table, in which correction levels and correction values are associated, that is stored in the NVRAM 302 and the acquired correction level (determine correction value according to the fixing device 200A in shipment state). In addition, the CPU 304 corrects the setting temperature of the heater 203 of the starter fixing device 200A based on the correction value determined. In S507, since the fixing device 200 mounted is the fixing device for maintenance (replacement fixing device) 200B, the CPU 304 adopts the correction value for unneeded correction (the aforementioned correction level and correction value of Table 1 are 0), and decides to adopt the setting temperature of the heater 203 of the fixing device for maintenance 200B. In S508, in order to determine whether or not the paper 101 is present inside the fixing device 200 based on the output signal from the sheet-discharging sensor 205, the CPU 304 sets the switch 407 to the "turn-on" state to thereby switch from the identification mode to the paper detection mode. By setting the switch 407 to the "turn-on" state, the CPU 304 causes the input port 401 to be pull-up connected through the resistor 403 (internal resistance) to the power supply voltage Vcc (set connection of internal resistance), and the CPU 304 then ends the processing.

As described above, in the present embodiment, without mounting a memory in the starter fixing device 200A and the fixing device for maintenance 200B, temperature control of the fixing device 200 can be performed based on optimal control parameters according to the fixing performance of the starter fixing device 200A. Further, even when the starter fixing device 200A is replaced with the fixing device for maintenance 200B due to reasons such as the device lifetime expiring or a device failure, a lower cost and energy savings can be realized without lowering the image quality.

As described above, according to the present embodiment, with a simple configuration, control can be performed according to information corrected based on characteristics information of a device constituting an image forming apparatus.

Embodiment 2

In Embodiment 1 an example was described in which the setting temperature of the heater of the fixing device is corrected according to whether the fixing device is the starter fixing device 200A mounted in a product shipment state or is the fixing device for maintenance 200B which was mounted as a replacement. In Embodiment 2, an example will be described in which, in order to perform image formation on paper, a target speed or an output voltage is corrected according to whether a transfer/conveyance unit configured to convey paper from a sheet feeding unit to a process cartridge is a transfer/conveyance unit mounted in the product shipment state or is a transfer/conveyance unit for maintenance mounted as a replacement. Note that, a laser printer to which the present embodiment is applied is similar to the laser printer in Embodiment 1, and the same reference characters are used for the same units and members as in Embodiment 1, and hence a description of such units and members is omitted here.

[Configuration of Transfer/Conveyance Unit]

Figure 6A:
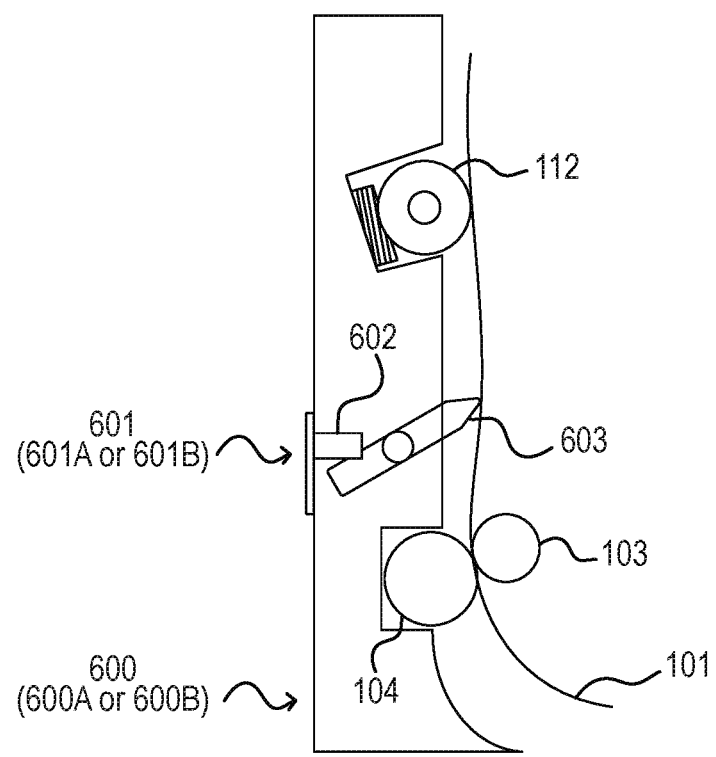
FIG. 6A and FIG. 6B are schematic cross-sectional views illustrating the configuration of a transfer/conveyance unit in Embodiment 2.
Figure 6B:
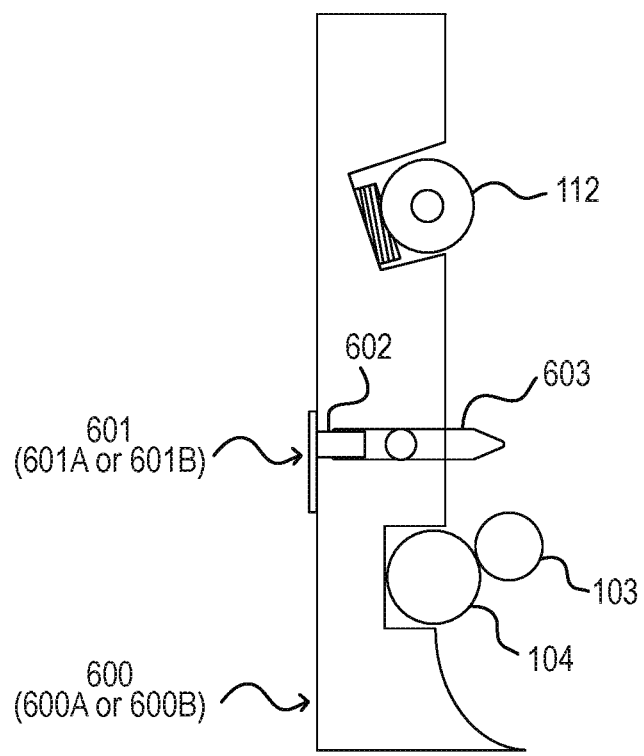

FIG. 6A and FIG. 6B are schematic cross-sectional views illustrating the configuration of a transfer/conveyance unit 600. FIG. 6A is a view illustrating a state when the paper 101 is passing through the transfer/conveyance unit 600, and illustrates a state when a toner image formed on the photosensitive drum 105 (not illustrated in FIG. 6A and FIG. 6B) is being transferred by the transfer roller 112 onto the paper 101. On the other hand, FIG. 6B is a view illustrating a state in which the paper 101 is not passing through the transfer/conveyance unit 600 (state in which sheet feeding of the paper 101 from the sheet feeding unit 116 (not illustrated in FIG. 6A and FIG. 6B) is not being performed). As illustrated in FIG. 6A and FIG. 6B, the conveyance roller pair 103 and 104 configured to convey the paper 101, the top sensor 601 configured to detect passage (stagnation) of the paper 101, and the transfer roller 112 configured to transfer a toner image onto the paper 101 are disposed in the transfer/conveyance unit 600. Note that, the transfer roller 112 and the conveyance roller 104 are driven by a drive system such as a motor (not illustrated), and the conveyance roller 103 rotates to follow rotation of the conveyance roller 104.

Further, when transferring a toner image on the photosensitive drum 105 onto the paper 101, a high voltage is applied from a high voltage power supply 704 (described later) to the transfer roller 112.

The top sensor 601 configured to detect a sheet passing state of the paper 101 (a state in which the paper 101 is passing through the transfer/conveyance unit 600) is mounted in the transfer/conveyance unit 600. The top sensor 601 is constituted by a photo-interrupter 602 and a mechanical flag 603 that are mounted on a base plate of the top sensor 601. The photo-interrupter 602 and the mechanical flag 603 have the same configuration as the photo-interrupter 206 and the mechanical flag 204 of the sheet-discharging sensor 205 described in Embodiment 1, and hence a description thereof is omitted here.

FIG. 6A is a view illustrating a state in which the paper 101 is passing through the transfer/conveyance unit 600. When the paper 101 passes through the transfer/conveyance unit 600, the paper 101 pushes up one end of the mechanical flag 603 and thereby causes the other end of the mechanical flag 603 to come out from the slit in the photo-interrupter 602. Consequently, because a light beam emitted from a light emitting unit of the photo-interrupter 602 is detected by a light receiving unit, the top sensor 601 can detect that the paper 101 is in the process of passing through (or is stagnant) inside of the transfer/conveyance unit 600 (inside of the conveyance unit). On the other hand, FIG. 6B is a view illustrating a state in which the paper 101 is not inside the transfer/conveyance unit 600. In this case, because one end of the mechanical flag 603 is not pushed up by the paper 101, the state is one in which the other end of the mechanical flag 603 stays inside the slit in the photo-interrupter 602. As a result, the light beam emitted from the light emitting unit of the photo-interrupter 602 is blocked by the mechanical flag 603, and the light receiving unit cannot detect the light beam. Thus, the top sensor 601 can detect that the paper 101 is not in the process of passing through (or is not stagnant) inside the transfer/conveyance unit 600.

[Configuration and Control of Transfer/Conveyance Unit and ECU]

Figure 7:
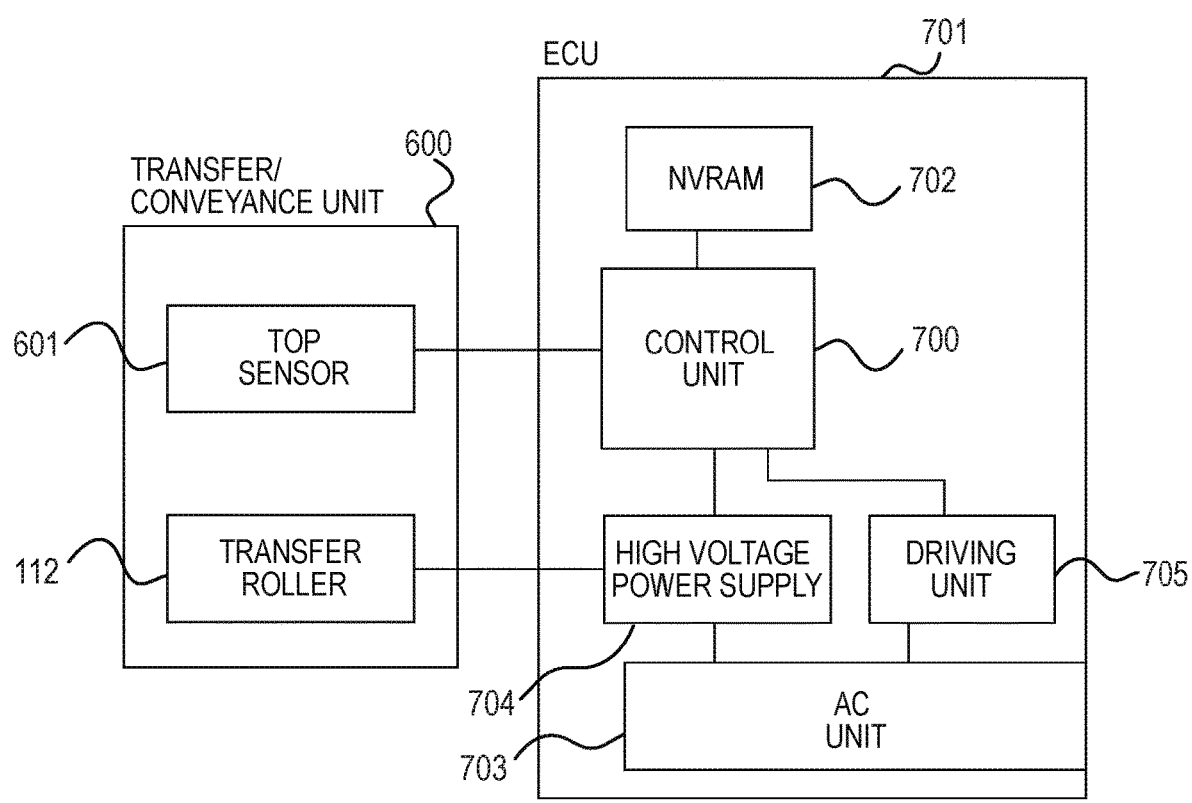
FIG. 7 is a block diagram for describing the configuration of the transfer/conveyance unit and an ECU in Embodiment 2.

FIG. 7 is a view for describing the configuration and control of the transfer/conveyance unit 600 and an ECU (Engine Control Unit) 701 configured to control each unit of the laser printer 118. As described previously, the top sensor 601 and the transfer roller 112 are mounted in the transfer/conveyance unit 600. In FIG. 7, diagrammatic illustration of portions of the apparatus that are not electrically involved such as the conveyance roller pair 103 and 104 is omitted. The ECU 701 includes: a control unit 700 configured to control the transfer/conveyance unit 600 and actuators (not illustrated) and the like; an NVRAM 702 that is a nonvolatile memory as a memory unit; a high voltage power supply 704; and an AC unit 703 configured to perform operations to supply power to the ECU 701 and a driving unit 705 and the like. The control unit 700 accesses the NVRAM 702 by communication by I2C, and performs reading of data stored in the NVRAM 702 and writing of data to the NVRAM 702. Further, the AC unit 703 generates a direct-current voltage from an alternating-current voltage input from an inlet (not illustrated), and supplies the direct-current voltage to the control unit 700, the high voltage power supply 704 and the driving unit 705. Note that, the supply of power to the transfer roller 112 is performed by the high voltage power supply 704, and control of the output voltage from the high voltage power supply 704 to the transfer roller 112 is performed by the control unit 700. Further, the conveyance roller 104 is driven by the driving unit 705, and control of the rotational speed of the conveyance roller pair 103 and 104 is performed by the control unit 700.

[Control of Conveyance Roller and Transfer Roller]

The conveyance roller 104 which the transfer/conveyance unit 600 includes has a tolerance with respect to the external diameter dimension thereof. Although the conveyance roller 104 is driven at a predetermined speed by an actuator or the like, due to a difference in the external diameter dimension, variations arise in the conveyance speed of the paper 101 that contacts against and is conveyed by the conveyance roller 104. A deviation in the conveyance speed relative to a target speed of the conveyance roller 104 due to a variation in the conveyance speed changes the behavior of the paper 101 conveyed, and causes a decrease in the image quality to occur in the form of image blurring or the like. Similarly, with respect to the transfer roller 112 that the transfer/conveyance unit 600 includes, due to a difference in the external diameter dimension or a difference in a characteristic (resistance value of the transfer roller 112), variations arise in the electric current characteristics in a case where the output voltage of the high voltage power supply 704 or a constant voltage is applied. Conventionally, control has been performed using default values having a balance so that image formation is practicable even if such variations arise.

To solve these problems, correction values that correct a difference (correction level) with a target value that arises due to a tolerance with respect to the external diameter dimension or characteristics of the conveyance roller 104 or the transfer roller 112 are actually measured or calculated in advance, and a table (Table 2) in which correction levels and correction values are associated is created. The table is stored in advance in the NVRAM 702 of the ECU 701. When manufacturing the transfer/conveyance unit 600, the characteristics and external diameter dimension of the conveyance roller 104 and the transfer roller 112 are measured, and correction levels are determined based on the measured characteristics and external diameter dimensions. The determined correction levels are, for example, displayed on a barcode or label of the transfer/conveyance unit 600. Thereafter, when assembling the transfer/conveyance unit 600 in the laser printer 118, the correction levels displayed on the barcode or label or the like on the transfer/conveyance unit 600 are written into the NVRAM 702 of the ECU 701. By this means, the control unit 700 acquires the correction levels of the conveyance roller 104 and the transfer roller 112 from the NVRAM 702 when performing image formation onto the paper 101. The control unit 700 acquires a corresponding correction value from the acquired correction level and the table (Table 2) stored in the NVRAM 702, and causes the correction value to be reflected in the speed setting of the conveyance roller 104 or the setting for the voltage to be applied to the transfer roller 112. Thus, control according to the characteristics of the conveyance roller 104 and the transfer roller 112 is enabled that is not influenced by variations in external diameter dimensions or characteristics.

Table 2 is one example of a table in which the aforementioned correction levels and correction values of the conveyance roller 104 and the transfer roller 112 are associated. In Table 2, the correction levels for the conveyance roller 104 and the transfer roller 112 are divided into nine levels, namely levels 1 to 9. The correction values correspond to the correction levels 1 to 9, with the correction values for the conveyance roller 104 being 4 to −4 and the correction values for the transfer roller 112 being 50 to −150. The correction values for the conveyance roller 104 are rates of change (%) in the speed relative to the target speed. For example, in a case where the correction level is 1, because the external diameter dimension of the conveyance roller 104 is 4% smaller than the standard value (correction level 5), the correction value is set as 4(%) so that the rotational speed becomes 104% (=100%+4%) of the target speed. On the other hand, the correction values of the transfer roller 112 are increases/decreases (V) in the voltage value relative to the standard output voltage of the high voltage power supply 704. For example, in a case where the correction level is "1", according to the characteristics of the transfer roller 112, the correction value is set to 50(V) so that the output voltage becomes 50V higher than the standard value (correction level 3) of 1150V of the high voltage power supply 704, that is, so that the output voltage becomes 1200V (=1150V+50V). Thus, in Table 2, correction values are set so as to achieve the required target speed (conveyance roller) or output voltage (transfer roller) by adding the relevant correction value.

TABLE 2

| | Conveyance Roller | | Transfer Roller | |
|---|---|---|---|---|
| Correction Level | Correction Value | Target Speed (Example) | Correction Value | Output Voltage (Example) |
| 1 | 4 | 104.0% | 50 | 1200 V |
| 2 | 3 | 103.0% | 25 | 1175 V |
| 3 | 2 | 102.0% | 0 | 1150 V |
| 4 | 1 | 101.0% | −25 | 1125 V |
| 5 | 0 | 100.0% | −50 | 1100 V |
| 6 | −1 | 99.0% | −75 | 1075 V |
| 7 | −2 | 98.0% | −100 | 1050 V |
| 8 | −3 | 97.0% | −125 | 1025 V |
| 9 | −4 | 96.0% | −150 | 1000 V |

In this connection, since the transfer/conveyance unit 600 is a replaceable consumable, in some cases, due to a reason such as the device lifetime expiring or a device failure after shipment of the product, the transfer/conveyance unit 600 is replaced with a transfer/conveyance unit for maintenance 600B. The aforementioned setting of correction levels in the NVRAM 702 is performed when assembling the transfer/conveyance unit 600 in the laser printer 118 at the factory. Therefore, the following situation sometimes occurs in a case where the transfer/conveyance unit 600 is replaced due to the device lifetime expiring or a device failure. That is, in some cases the correction levels for the conveyance roller 104 and the transfer roller 112 prior to replacement that are stored in the NVRAM 702 do not match the correction levels of a transfer/conveyance unit 600B newly installed as a replacement. Further, accompanying replacement of the transfer/conveyance unit 600, in order to change the correction levels that were set in the NVRAM 702 to correspond with the correction levels of the transfer/conveyance unit 600B newly installed as a replacement, it is necessary to access the base plate on which the control unit 700 is mounted and to communicate with the control unit 700. Therefore, it is difficult to write new correction levels in the NVRAM 702. Consequently, in order to perform control of the conveyance roller 104 and the transfer roller 112, it is necessary to distinguish whether the mounted transfer/conveyance unit 600 is a transfer/conveyance unit 600A for which correction levels were set in the NVRAM 702, or is the transfer/conveyance unit for maintenance 600B mounted as a replacement. In a case where the mounted transfer/conveyance unit 600 is the transfer/conveyance unit for maintenance 600B, it is necessary to change the correction levels for the pre-replacement conveyance roller 104 and transfer roller 112 that are stored in the NVRAM 702 to correction levels corresponding to the transfer/conveyance unit for maintenance 600B. By this means, control according to the external diameter dimensions and characteristics of the conveyance roller 104 and the transfer roller 112 is correctly performed, and it is possible to ensure that a decrease in image quality or the like does not occur.

[Distinguishing the Transfer/Conveyance Unit]

Figure 8A:
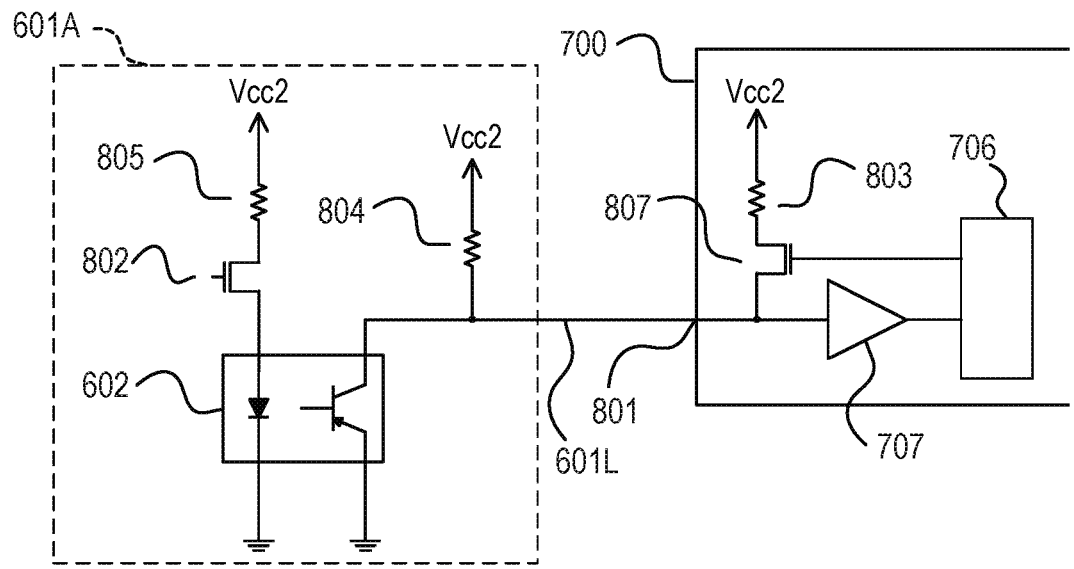
FIG. 8A and FIG. 8B are views for describing connections between the transfer/conveyance unit and a control unit in Embodiment 2.
Figure 8B:
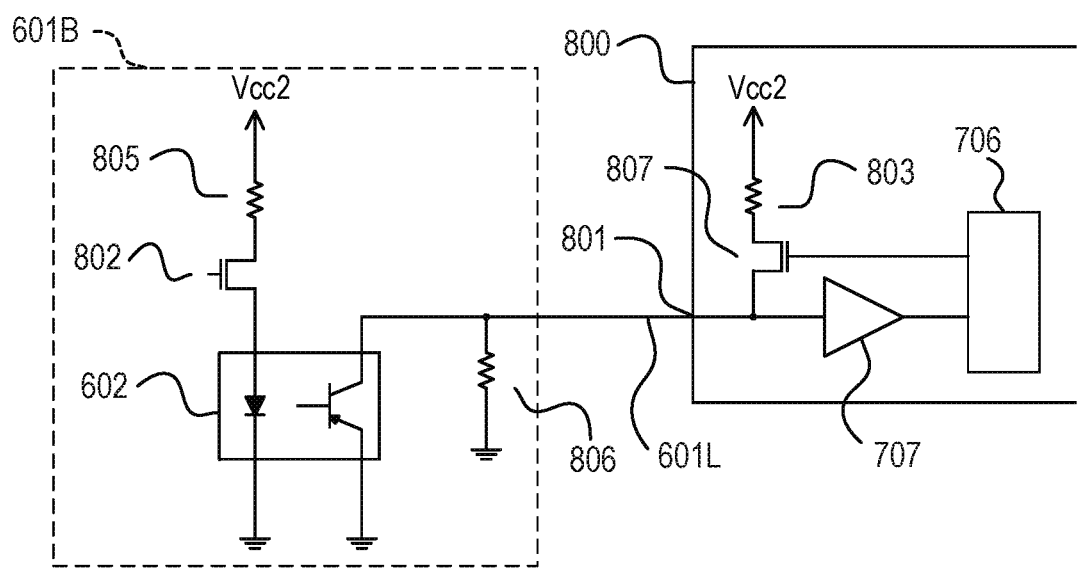

FIG. 8A and FIG. 8B are views for describing configurations of and connections between the top sensor 601 mounted in the transfer/conveyance unit 600 and the control unit 700 of the ECU 701. FIG. 8A is a view illustrating a connection between a top sensor 601A of the transfer/conveyance unit 600A mounted when the laser printer 118 was shipped and the control unit 700. On the other hand, FIG. 8B is a view illustrating a connection between the control unit 700 and a top sensor 601B of the transfer/conveyance unit for maintenance 600B mounted as a replacement due to a reason such as the device lifetime expiring.

The control unit 700 has an input port 801 into which a signal from the top sensor 601 of the transfer/conveyance unit 600 is input through a common signal line 601L. The input port 801 is connected to a buffer 707, and the buffer 707 outputs the signal input, to a CPU 706 that is a control unit. The input port 801 is connected to one end of a switch 807 which is subjected to on-off control by the CPU 706. The other end of the switch 807 is connected to one end of a resistor 803. The other end of the resistor 803 is pull-up connected to a power supply voltage Vcc2. By turning on the switch 807, the CPU 706 causes the input port 801 to be pull-up connected to the power supply voltage Vcc2 through the resistor 803. On the other hand, the CPU 706 cuts off (disconnects) the connection between the input port 801 and the resistor 803 by turning off the switch 807. The switch 807 is a semiconductor switch such as a transistor or a field effect transistor (FET). In a case where the switch 807 is a transistor, the CPU 706 carries out on-off control by performing control of the voltage to the base terminal. In a case where the switch 807 is an FET, the CPU 706 carries out on-off control by performing control of the voltage to the gate terminal.

The top sensor 601 of the transfer/conveyance unit 600 includes the photo-interrupter 602 mounted on a base plate of the top sensor 601, and a resistor 804 or a resistor 806 for identification that is an identification unit for identifying the transfer/conveyance unit 600. Note that, the resistor 804 is mounted on the base plate of the top sensor 601A in the case where the transfer/conveyance unit 600 is the transfer/conveyance unit 600A mounted in the shipment state of the laser printer (which is also the product shipment state). On the other hand, the resistor 806 is mounted on the base plate of the top sensor 601B of the transfer/conveyance unit for maintenance 600B that is used in a case of replacing the transfer/conveyance unit 600.

The photo-interrupter 602 includes an LED that is a light emitting unit, and a phototransistor that is a light receiving unit configured to detect a light beam from the LED. Furthermore, a slit (not illustrated in FIG. 8A and FIG. 8B) is provided between the LED and the phototransistor, and the photo-interrupter 602 is configured so that the mechanical flag 603 (not illustrated in FIG. 8A and FIG. 8B) moves through the slit according to the state of the paper 101 that passes through the transfer/conveyance unit 600. An anode terminal of the LED of the photo-interrupter 602 is connected to a resistor 805 connected to the power supply voltage Vcc2, through a switch 802. The switch 802 is subjected to on-off control by the CPU 706 of the control unit 700. When the CPU 706 turns on the switch 802, the LED of the photo-interrupter 602 is pull-up connected to the power supply voltage Vcc2 through the resistor 805. On the other hand, when the CPU 706 turns off the switch 802, the connection between the LED of the photo-interrupter 602 and the resistor 805 is cut off (disconnected). As a result, the LED of the photo-interrupter 602 enters a non-conducting state, and a disablement state is entered in which the photo-interrupter 602 cannot detect the state of the paper 101. Note that, the switch 802 is constituted by a semiconductor switch such as a transistor or a field effect transistor (FET). In a case where the switch 802 is a transistor, the CPU 706 carries out on-off control by performing control of the voltage to the base terminal. In a case where the switch 802 is an FET, the CPU 706 carries out on-off control by performing control of the voltage to the gate terminal.

When the switch 802 is in an "turn-on" state, because the LED of the photo-interrupter 602 is connected to the power supply voltage Vcc2 through the resistor 805, the LED is always in a conducting state. Further, in the case of a light-transmission state in which the mechanical flag 603 is not present in the slit, the phototransistor of the photo-interrupter 602 enters an "turn-on" state because the phototransistor receives the light beam from the LED. On the other hand, in the case of a light-shielded state in which the mechanical flag 603 has entered the slit, the phototransistor of the photo-interrupter 602 enters an "turn-off" state because the light beam from the LED is blocked by the mechanical flag 603.

The collector terminal of the phototransistor of the photo-interrupter 602 is the output terminal of an open collector, and is connected to the input port 801 of the control unit 700. One end of the resistor 804 of the top sensor 601A of the transfer/conveyance unit 600A mounted in the shipment state is connected to the collector terminal of the phototransistor of the photo-interrupter 602, and the other end of the resistor 804 is pull-up connected to the power supply voltage Vcc2 (FIG. 8A). On the other hand, one end of the resistor 806 of the top sensor 601B of the transfer/conveyance unit for maintenance 600B is connected to the collector terminal of the phototransistor of the photo-interrupter 602, and the other end of the resistor 806 is pull-down connected to a ground (GND) (FIG. 8B). Note that, in the present embodiment, the resistance values of the resistors 804 and 806 are made resistance values which are sufficiently larger than the resistance value of the resistor 803 of the control unit 700.

[Paper Detection Mode and Identification Mode]

Next, a method through which the CPU 706 determines whether or not the transfer/conveyance unit 600 is a transfer/conveyance unit for maintenance based on a signal input from the input port 801 through the buffer 707 will be described. Further, a method through which the CPU 706 determines whether or not the paper 101 is passing through the transfer/conveyance unit 600 based on a signal input from the input port 801 through the buffer 707 will be described. First, the method through which the CPU 706 determines whether or not the current state is one in which the paper 101 is passing through the transfer/conveyance unit 600 based on a signal level input to the input port 801 from the top sensor 601 will be described. In this case, the CPU 706 sets the switch 807 to the "turn-on" state, and sets the input port 801 in a state in which the input port 801 is pull-up connected to the power supply voltage Vcc2 through the resistor 803. Further, the CPU 706 sets the switch 802 of the top sensor 601 to the "turn-on" state to thereby set the LED of the photo-interrupter 602 to a conducting state.

In a case where the transfer/conveyance unit 600 illustrated in FIG. 8A is the transfer/conveyance unit 600A mounted in the product shipment state, the resistor 804 is pull-up connected to the power supply voltage Vcc2. Therefore, the resistance value with respect to the input signal to the input port 801 becomes the combined resistance for a case where the resistor 804 and the resistor 803 are connected in parallel. On the other hand, in the case of the transfer/conveyance unit for maintenance 600B illustrated in FIG. 8B, because the resistor 806 is pull-down connected to the ground (GND), the voltage value of an input signal to the input port 801 is a voltage obtained when the power supply voltage Vcc2 is divided by the resistor 803 and the resistor 806. At this time, because the resistor 806 has a sufficiently larger resistance value than the resistor 803, a threshold value for a "high" level and a "low" level with respect to the CPU 706 can be satisfied. In a case where a signal level input to the input port 801 is the "high" level (first signal), because the phototransistor of the photo-interrupter 602 is in an "turn-off" state, the CPU 706 determines that the paper 101 is not inside (not stagnant inside) the transfer/conveyance unit 600. On the other hand, in a case where the signal level input from the input port 801 is the "low" level (second signal), because the phototransistor of the photo-interrupter 602 is in an "turn-on" state, the CPU 706 determines that the paper 101 is passing through (is stagnant inside) the transfer/conveyance unit 600.

Next, a method through which the CPU 706 determines whether or not the transfer/conveyance unit 600 is a transfer/conveyance unit for maintenance based on a signal level input to the input port 801 from the top sensor 601 will be described. In this case, by turning off the switch 807, the CPU 706 cuts off the connection between the input port 801 and the resistor 803, and thereby sets the configuration so that a state is not entered in which the input port 801 is pull-up connected to the power supply voltage Vcc2 through the resistor 803. At this time, in a case where the paper 101 is passing through (or stagnant inside) the transfer/conveyance unit 600, the phototransistor of the photo-interrupter 602 is in an "turn-on" state, and the input signal to the input port 801 of the control unit 700 is fixed in the "low" level state. As a result, a determination as to whether the transfer/conveyance unit 600 is the transfer/conveyance unit 600A mounted in the product shipment state or is the transfer/conveyance unit for maintenance 600B cannot be correctly performed.

Therefore, in the present embodiment, the CPU 706 sets the switch 802 of the top sensor 601 to the "turn-off" state, and the LED of the photo-interrupter 602 does not enter a conducting state, and as a result the phototransistor of the photo-interrupter 602 is set so as to enter the "turn-off" state. Then, if the signal level of the input port 801 when the phototransistor of the photo-interrupter 602 is in the "turn-off" state is the "high" level (first signal), the CPU 706 determines that the top sensor 601 has the resistor 804. Therefore, the CPU 706 determines that the transfer/conveyance unit 600 is the transfer/conveyance unit 600A mounted in the product shipment state. On the other hand, if the signal level at the input port 801 when the phototransistor of the photo-interrupter 602 is in the "turn-off" state is the "low" level (second signal), the CPU 706 determines that the top sensor 601 has the resistor 806. Therefore, the CPU 706 determines that the transfer/conveyance unit 600 is the transfer/conveyance unit for maintenance 600B.

As described above, in the case of determining whether the transfer/conveyance unit 600 is the transfer/conveyance unit 600A mounted in the product shipment state or is the transfer/conveyance unit for maintenance 600B, the CPU 706 sets the switch 807 to the "turn-off" state. On the other hand, in the case of detecting whether or not the paper 101 is passing through the transfer/conveyance unit 600, the CPU 706 sets the switch 807 to the "turn-on" state. Thus, the switch 807 is a changeover switch configured to switch between an "identification mode" configured to identify whether or not the transfer/conveyance unit 600 is a transfer/conveyance unit for maintenance and a "paper detection mode" configured to detect whether or not the paper 101 is passing through the transfer/conveyance unit 600. Note that, in the case of Embodiment 1, it is necessary that the state when setting the "identification mode" is a state in which the paper 101 is not passing through the inside of the target unit (in Embodiment 1, the fixing device 200), or is a state in which the paper 101 is not stagnant inside the unit. In Embodiment 2, the switch 802 is provided in the top sensor 601, and when the CPU 706 sets the switch 802 to the "turn-off" state, the top sensor 601 cannot detect the paper 101. Therefore, in Embodiment 2, it is not necessary for a fact that the paper 101 is not present inside the unit to be a precondition as in Embodiment 1.

Note that, although in the present embodiment the resistor 804 is pull-up connected to the power supply voltage Vcc2, and the resistor 806 is connected to the ground (GND), a configuration may also be adopted in which the resistor 804 is connected to the ground (GND), and the resistor 806 is pull-up connected to the power supply voltage Vcc2. In this case, in a case where the signal level at the input port 801 is the "low" level, it is determined that the transfer/conveyance unit 600 is the transfer/conveyance unit 600A mounted in the product shipment state. On the other hand, in a case where the signal level at the input port 801 is the "high" level, it is determined that the transfer/conveyance unit 600 is the transfer/conveyance unit for maintenance 600B.

[Control Sequence for Distinguishing Transfer/Conveyance Unit]

Figure 9:
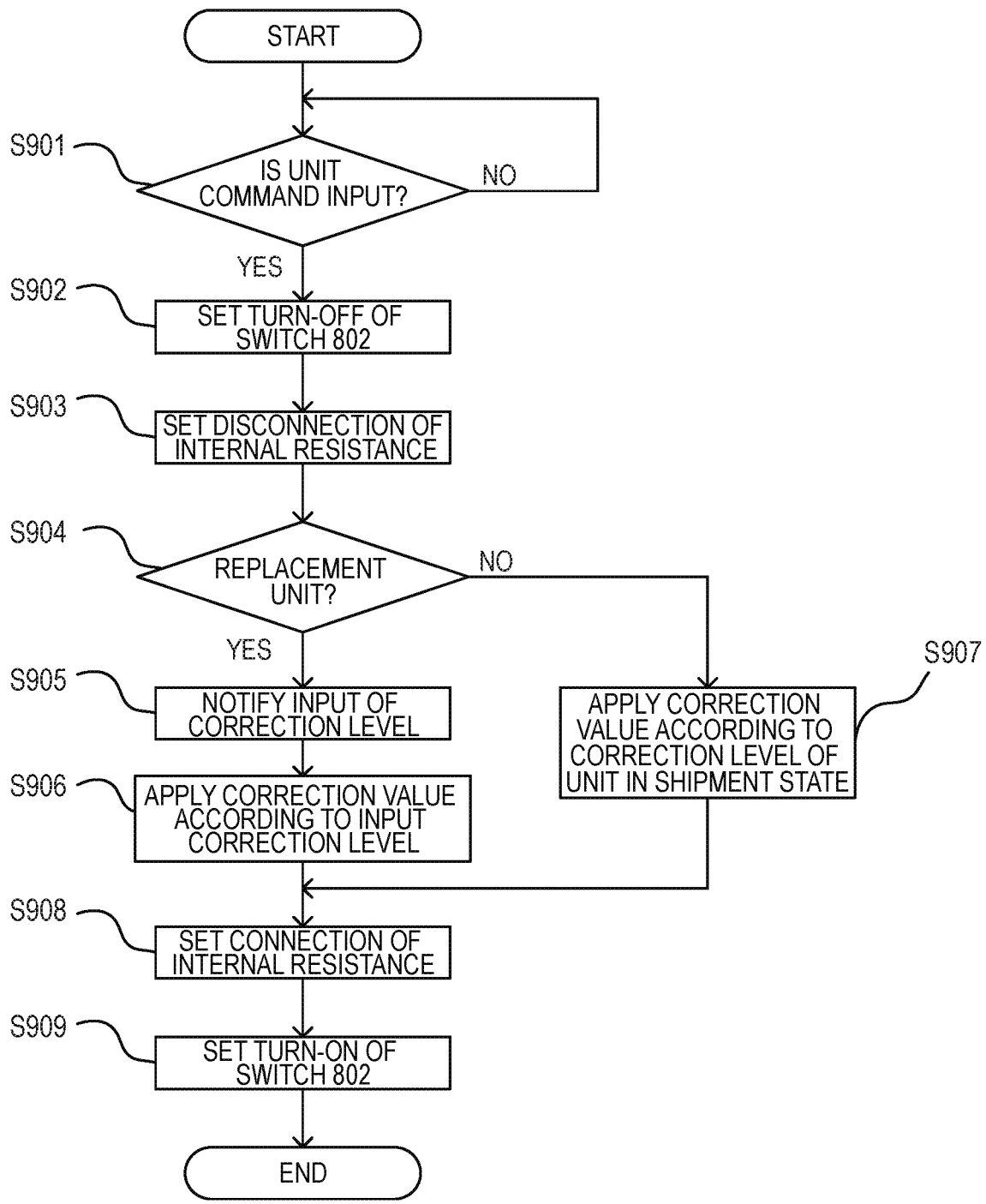
FIG. 9 is a flowchart illustrating a control sequence for distinguishing the transfer/conveyance unit of Embodiment 2.

FIG. 9 is a flowchart illustrating a control sequence for distinguishing whether the transfer/conveyance unit 600 mounted in the laser printer 118 is the transfer/conveyance unit 600A mounted in the product shipment state or is the transfer/conveyance unit for maintenance (for replacement) 600B. The processing illustrated in FIG. 9 is activated when the power of the laser printer 118 is turned on, and is executed by the CPU 706. Note that, it is assumed that correction levels of the conveyance roller 104 and the transfer roller 112 of the transfer/conveyance unit 600A mounted in the product shipment state are stored in advance in the NVRAM 702 of the control unit 700. Furthermore, it is assumed that a table in which correction levels of the conveyance roller 104 and the transfer roller 112 of the transfer/conveyance unit 600 and correction values for the target speed of the conveyance roller 104 and for the output voltage of the high voltage power supply 704 to the transfer roller 112 are associated is also stored in advance.

In S901, the CPU 706 determines whether or not a service person input a unit command for setting a correction level of the transfer/conveyance unit 600 from the operation unit 119. If the CPU 706 determines that a unit command was input, the CPU 706 advances the processing to S902, and if the CPU 706 determines that a unit command was not input, the CPU 706 returns the processing to S901.

In S902, the CPU 706 sets the switch 802 to the "turn-off" state so that the photo-interrupter 602 of the transfer/conveyance unit 600 does not detect the paper 101. In S903, in order to determine whether or not the transfer/conveyance unit 600 is a transfer/conveyance unit for maintenance (replacement unit), the CPU 706 sets the switch 807 to the "turn-off" state to thereby switch to the aforementioned identification mode. By setting the switch 807 to the "turn-off" state, the CPU 706 cuts off (disconnects) the connection between the input port 801 and the resistor 803 (internal resistance) (set disconnection of internal resistance). In S904, the CPU 706 determines whether or not the transfer/conveyance unit 600 is a replacement unit based on an output signal from the top sensor 601 of the transfer/conveyance unit 600 input to the input port 801. If the output signal from the top sensor 601 of the transfer/conveyance unit 600 input to the input port 801 is the "low" level, the CPU 706 determines that the transfer/conveyance unit 600 is a replacement unit 600B, and advances the processing to S905. On the other hand, if the output signal from the top sensor 601 of the transfer/conveyance unit 600 input to the input port 801 is the "high" level, the CPU 706 determines that the transfer/conveyance unit 600 is not the replacement unit 600B (is the transfer/conveyance unit 600A mounted in the shipment state), and advances the processing to S907.

In S905, the CPU 706 displays a message on the display unit of the operation unit 119 to notify a service person to input correction levels for the conveyance roller 104 and the transfer roller 112 of the replacement unit 600B (notify input of correction level). In S906, the CPU 706 acquires correction levels for the conveyance roller 104 and the transfer roller 112 that are displayed on the replacement transfer/conveyance unit 600B which were input by the service person from the operation unit 119. The CPU 706 determines the corresponding correction values based on the acquired correction levels and the table, in which correction levels and correction values are associated, that is stored in the NVRAM 702. The CPU 706 applies a target speed of the conveyance roller 104 and an output voltage that the high voltage power supply 704 applies to the transfer roller 112 which are based on the determined correction values to control of the conveyance roller 104 and control of the high voltage power supply 704.

In S907, the CPU 706 acquires the correction levels for the conveyance roller 104 and the transfer roller 112 of the transfer/conveyance unit 600 mounted in the shipment state from the NVRAM 702. The CPU 706 determines the corresponding correction values for the conveyance roller 104 and the transfer roller 112 based on the table, in which correction levels and correction values for the conveyance roller 104 and the transfer roller 112 are associated, that is stored in the NVRAM 702, and the acquired correction levels. The CPU 706 applies a target speed of the conveyance roller 104 and an output voltage that the high voltage power supply 704 applies to the transfer roller 112 which are based on the determined correction values to control of the conveyance roller 104 and control of the high voltage power supply 704.

In S908, in order to determine whether or not the paper 101 is present inside the transfer/conveyance unit 600 based on the output signal from the top sensor 601, the CPU 706 sets the switch 807 to the "turn-on" state to thereby switch from the aforementioned identification mode to the paper detection mode. By setting the switch 807 to the "turn-on" state, the CPU 706 causes the input port 801 to be pull-up connected through the resistor 803 (internal resistance) to the power supply voltage Vcc2 (set connection of internal resistance). In S909, the CPU 706 sets the switch 802 to the "turn-on" state so that the photo-interrupter 602 of the transfer/conveyance unit 600 can detect the paper 101, and then ends the processing.

As described above, in the present embodiment, without mounting a memory in the transfer/conveyance units 600A and 600B, the target speed of the conveyance roller 104 and the output voltage of the high voltage power supply 704 of the transfer/conveyance unit 600A can be optimally controlled. Further, even when the transfer/conveyance unit 600 is replaced due to reasons such as the device lifetime expiring or a device failure, the target speed of the conveyance roller 104 and the output voltage of the high voltage power supply 704 are corrected according to the correction levels for the conveyance roller 104 and the transfer roller 112 of the transfer/conveyance unit 600B mounted as a replacement. Thus, a lower cost and energy savings can be realized without lowering the image quality.

Note that, although the switch 802 as provided in the photo-interrupter 602 of Embodiment 2 is not provided in the photo-interrupter 206 of Embodiment 1, a configuration in which the switch 802 is provided may be adopted. By providing the switch 802, the processing for checking whether or not the paper 101 is present inside the fixing device 200 that is performed in S502 and S503 of FIG. 5 can be omitted. On the other hand, although the switch 802 is provided in the photo-interrupter 602 of Embodiment 2, a configuration in which the switch 802 is not provided, as in the photo-interrupter 206 of Embodiment 1, may be adopted. In this case, because the switch 802 is not provided, for the processing in S902 of FIG. 9 it is necessary to perform processing similar to the processing for checking whether or not the paper 101 is present inside the fixing device 200 and processing to remove any residual paper 101 that are performed in S501 to S503 of Embodiment 1.

Further, in FIG. 5 of Embodiment 1, the processing for distinguishing whether the fixing device 200 mounted in the laser printer 118 is the fixing device 200A mounted in the product shipment state or is the fixing device for maintenance 200B is performed each time the power of the laser printer 118 is turned on. For example, a configuration may be adopted so that the processing illustrated in FIG. 5 is activated in a case where a service person inputs a command from the operation unit 119, as in the processing illustrated in FIG. 9 of Embodiment 2. In addition, according to the processing illustrated in FIG. 5 of Embodiment 1, although the setting temperature of the heater 203 of the fixing device 200B is not subjected to a correction when the fixing device 200 is replaced, for example, a configuration may be adopted that enables a correction level to be set by inputting the correction level from the operation unit 119 as in Embodiment 2.

As described above, according to the present embodiment, utilizing a simple configuration, control can be performed according to information corrected based on characteristics information of a unit constituting an image forming apparatus.

Embodiment 3

In Embodiment 1 an example of distinguishing whether a mounted fixing device is a starter fixing device 200A or a fixing device for maintenance 200B, and in a case where the fixing device is the fixing device for maintenance 200B, performing temperature control of a heater having a setting temperature at a default value was described. That is, in a case where the fixing device 200B was mounted, temperature setting that takes into account individual differences of the fixing device 200B was not performed.

In Embodiment 3, an example in which correction of temperature control of the heater is performed also in a case where the mounted fixing device is the fixing device for maintenance 200B is described. Note that, a laser printer to which the present embodiment is applied is a similar laser printer to the laser printer of Embodiment 1, and the same reference characters are used for the same units and members as in Embodiment 1, and hence a description of such units and members is omitted here.

[Configuration and Control of Fixing Device and ECU]

Figure 10A:
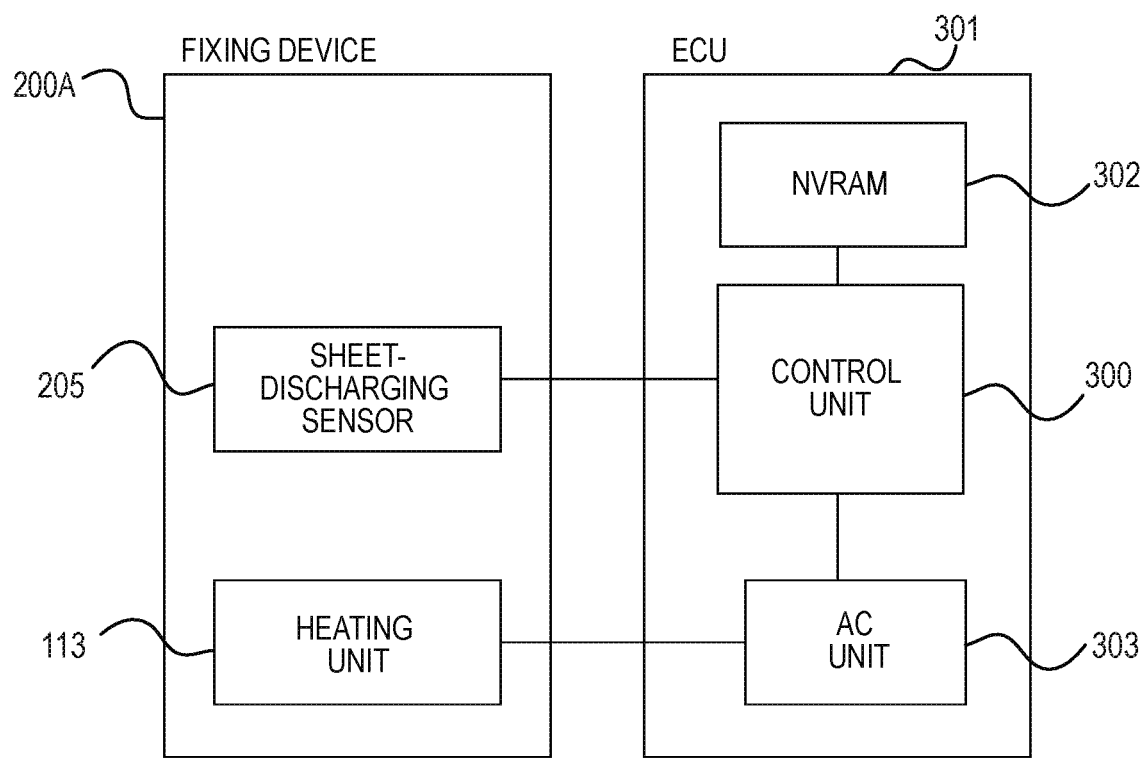
FIG. 10A and FIG. 10B are block diagrams for describing the configuration of the fixing device and an ECU of Embodiments 3 and 4.
Figure 10B:
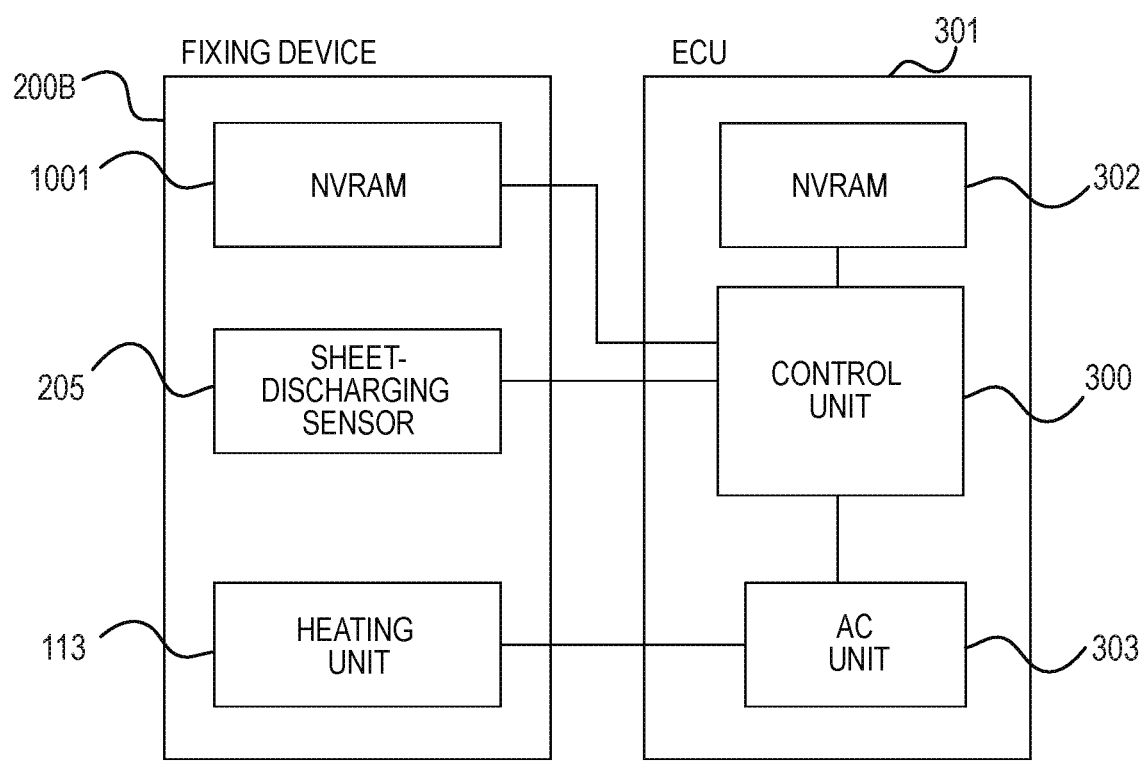

FIG. 10A and FIG. 10B are views for describing the configuration and control of the fixing device 200 and the ECU 301. FIG. 10A is a view illustrating connections between the starter fixing device 200A and the ECU 301. The configuration of the fixing device 200 mounted in the product shipment state is the same as in the case of Embodiment 1, and hence a description thereof is omitted here. On the other hand, FIG. 10B is a view illustrating connections between the fixing device for maintenance 200B and the ECU 301.

With regard to the fixing device for maintenance 200B illustrated in FIG. 10B, the configuration of the sheet-discharging sensor 205 and the heating unit 113 is the same as in the case of Embodiment 1. In the fixing device for maintenance 200B of the present embodiment, an NVRAM 1001 that is a nonvolatile memory as a memory unit is mounted, and is connected to the control unit 300. It is possible for the control unit 300 to access the NVRAM 1001 by communication by I2C, and perform reading of data stored in the NVRAM 1001 and writing of data to the NVRAM 1001. Information regarding a correction level of the fixing device for maintenance 200B is stored in the NVRAM 1001. Thus, in the fixing device for maintenance 200B also, the control unit 300 can acquire a correction level for the fixing device for maintenance 200B from the NVRAM 1001 when performing image formation on the paper 101, and can acquire a corresponding correction value from the acquired correction level and the table (Table 1) stored in the NVRAM 302. As a result, the control unit 300 can reflect characteristics data of the fixing device for maintenance 200B in the temperature setting of the heater 203. A method for distinguishing whether the fixing device 200 is the starter fixing device 200A or the fixing device for maintenance 200B, and the paper detection mode and the identification mode are the same as in the case of Embodiment 1, and hence a description thereof is omitted here.

[Control Sequence for Distinguishing Fixing Device]

Figure 11:
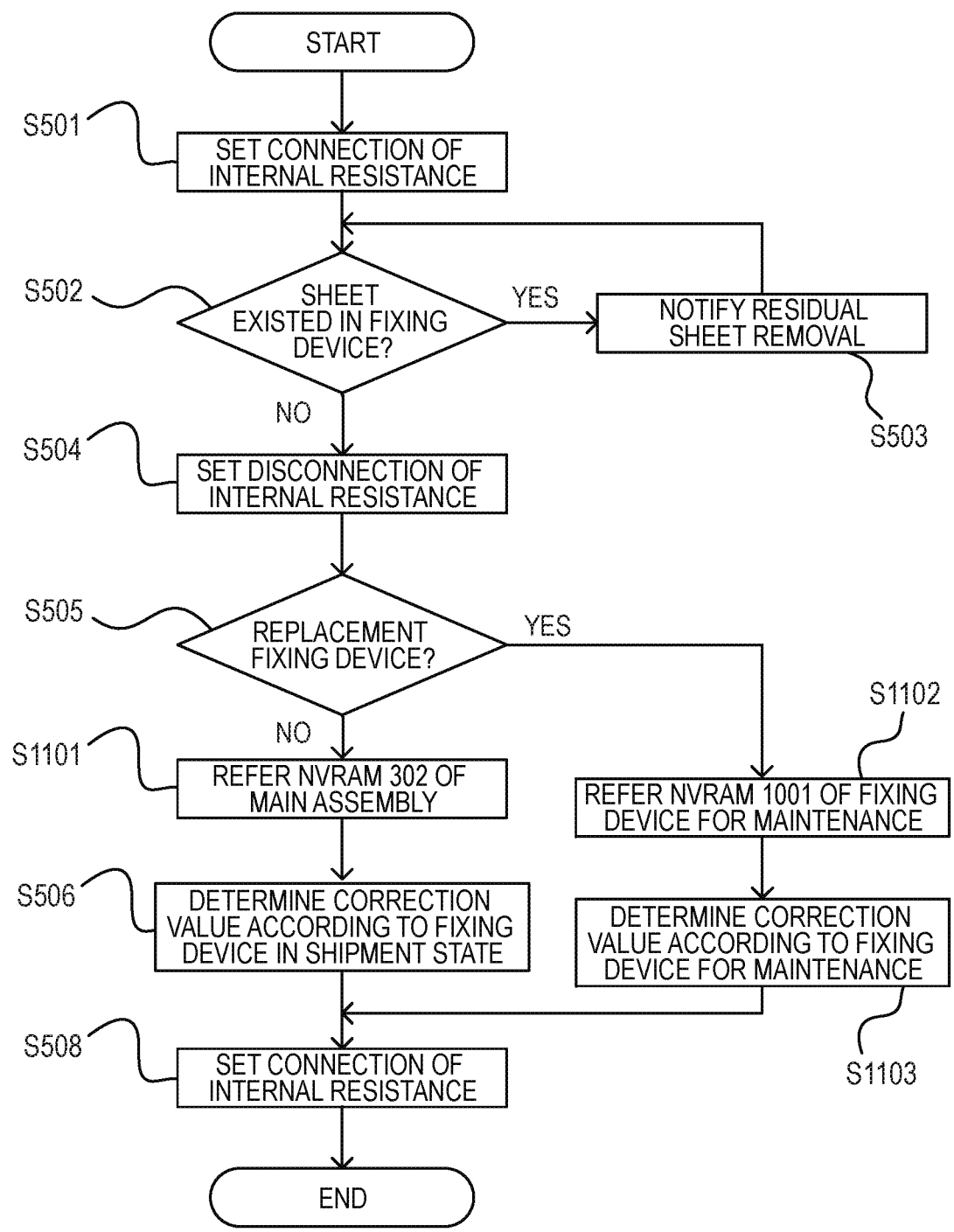
FIG. 11 is a flowchart illustrating a control sequence for distinguishing the fixing device of Embodiment 3.

FIG. 11 is a flowchart illustrating a control sequence for distinguishing whether the fixing device 200 mounted in the laser printer 118 is the starter fixing device 200A or is the fixing device for maintenance 200B. The processing illustrated in FIG. 11 is activated when the power of the laser printer 118 is turned on, and is executed by the CPU 304. Note that, it is assumed that a correction level of the starter fixing device 200A, and a table in which correction levels of the starter fixing device 200A and correction values for the setting temperature of the heater 203 are associated are stored in advance in the NVRAM 302 of the control unit 300. Further, it is assumed that a correction level of the fixing device for maintenance 200B is stored in advance in the NVRAM 1001.

The processing up to S504 is the same as in the case of Embodiment 1, and hence a description thereof is omitted here. In S505, the CPU 304 determines whether or not the fixing device 200 is the fixing device for maintenance 200B, based on an output signal from the sheet-discharging sensor 205 of the fixing device 200 input to the input port 401. In a case where the output signal from the sheet-discharging sensor 205 of the fixing device 200 input to the input port 401 is the "low" level, the CPU 304 determines that the fixing device 200 is the fixing device for maintenance 200B, and advances the processing to S1102. On the other hand, in a case where the output signal from the sheet-discharging sensor 205 of the fixing device 200 input to the input port 401 is the "high" level, the CPU 304 determines that the fixing device 200 is the starter fixing device 200A, and advances the processing to S1101. In S1101, since the fixing device 200 mounted is the starter fixing device 200A, the CPU 304 sets the NVRAM 302 mounted on the main assembly as the NVRAM to refer to in order to acquire the correction level of the starter fixing device 200A. Next, in S506, the CPU 304 determines a correction value according to the individual characteristics of the starter fixing device 200A based on the table, in which correction levels and correction values are associated, that is stored in the NVRAM 302, and the correction level acquired from the NVRAM 302. In addition, the CPU 304 corrects the setting temperature of the heater 203 of the starter fixing device 200A based on the correction value determined. In S1102, since the fixing device 200 mounted is the fixing device for maintenance 200B, the CPU 304 sets the NVRAM 1001 mounted in the fixing device for maintenance 200B as the NVRAM to refer to in order to acquire the correction level of the fixing device for maintenance 200B. Next, in S1103, the CPU 304 determines the correction value according to the individual characteristics of the fixing device for maintenance 200B based on the table, in which correction levels and correction values are associated, that is stored in the NVRAM 302, and the correction level acquired from the NVRAM 1001. In addition, the CPU 304 corrects the setting temperature of the heater 203 of the fixing device for maintenance 200B based on the correction value determined. In S508, in order to determine whether or not the paper 101 is present inside the fixing device 200 based on the output signal from the sheet-discharging sensor 205, the CPU 304 sets the switch 407 to the "turn-on" state to thereby switch from the identification mode to the paper detection mode. By setting the switch 407 to the "turn-on" state, the CPU 304 causes the input port 401 to be pull-up connected through the resistor 403 (internal resistance) to the power supply voltage Vcc (set connection of internal resistance), and the CPU 304 then ends the processing.

As described above, according to the present embodiment, even in a case where the fixing device 200 was replaced due to the device lifetime expiring or a device failure or the like, temperature control of the fixing device for maintenance 200B can be performed based on optimal control parameters according to the individual characteristics of the fixing device for maintenance 200B.

Embodiment 4

In Embodiment 1 an example was described in which a determination as to whether the fixing device 200 is the starter fixing device 200A or the fixing device for maintenance 200B is made using a signal line (common signal line 205L) of a sheet-discharging sensor mounted in the fixing device 200. In Embodiment 4, an example in which a determination as to whether the fixing device 200 is the starter fixing device 200A or the fixing device for maintenance 200B is made using a signal line for communication (common signal line 1001L) with a memory mounted in the fixing device 200 is described. Note that, a laser printer to which the present embodiment is applied is a similar laser printer to the laser printer of Embodiment 1, and the same reference characters are used for the same units and members as in Embodiment 1, and hence a description of such units and members is omitted here.

[Configuration and Control of Fixing Device and ECU]

The configurations of the fixing device 200 and the ECU in the present embodiment are the same as the configurations illustrated in FIG. 10A and FIG. 10B that was described in Embodiment 3. As illustrated in FIG. 10B, the NVRAM 1001 that is a nonvolatile memory as a memory unit is mounted in the fixing device for maintenance 200B, and information regarding a correction level of the fixing device for maintenance 200B is stored in the NVRAM 1001.

[Distinguishing the Fixing Device]

Figure 12A:
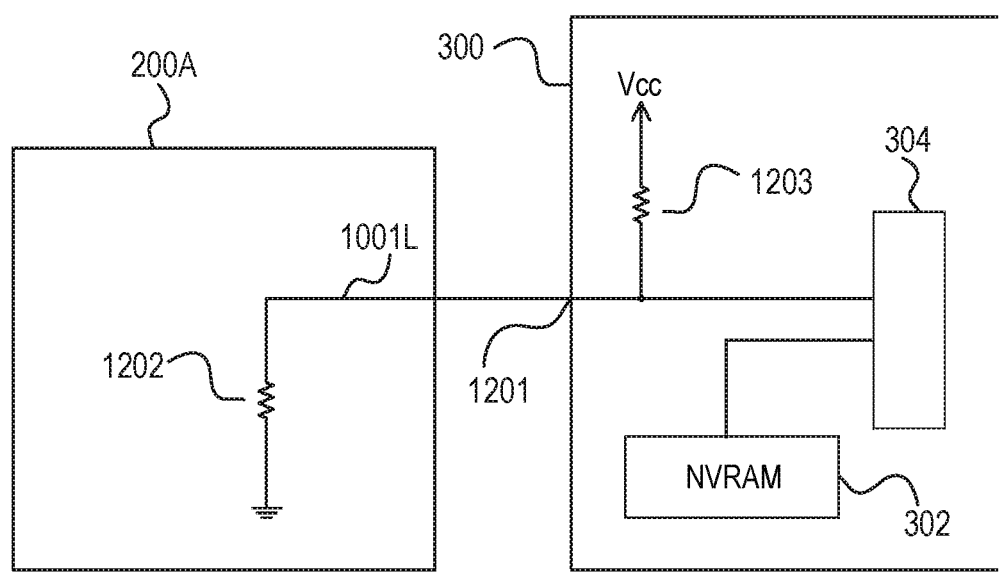
FIG. 12A and FIG. 12B are views for describing connections between the fixing device and a control unit in Embodiment 4.
Figure 12B:
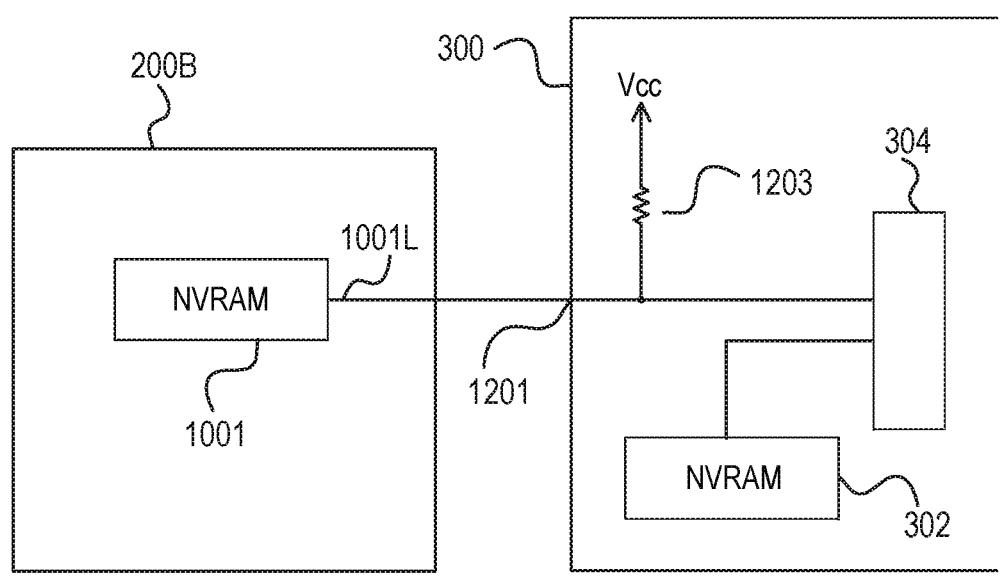

FIG. 12A and FIG. 12B are views for describing the configurations of the fixing device 200 and the control unit 300 of the ECU 301 as well as connections between the fixing device 200 and the control unit 300. FIG. 12A is a view illustrating a connection between the starter fixing device 200A and the control unit 300. On the other hand, FIG. 12B is a view illustrating a connection between the fixing device for maintenance 200B and the control unit 300.

The control unit 300 has an input/output port 1201 used for transmitting signals to and from the fixing device 200. The input/output port 1201 is connected to the CPU 304 that is a control unit. The input/output port 1201 is also connected to one end of a resistor 1203. The other end of the resistor 1203 is pull-up connected to the power supply voltage Vcc. The NVRAM 302 that is a nonvolatile memory as a memory unit is connected to the CPU 304. A correction level of the starter fixing device 200A, and a table, in which correction levels of the starter fixing device 200A and correction values for the setting temperature of the heater 203 are associated, are stored in advance in the NVRAM 302.

In a case where the fixing device 200 is the starter fixing device 200A, the starter fixing device 200A has a resistor 1202 for identification that is an identification unit for identifying the fixing device 200. One end of the resistor 1202 is connected to the input/output port 1201 of the control unit 300, and the other end is pull-down connected to the ground (GND) (FIG. 12A). Note that, in the present embodiment, the resistance value of the resistor 1202 is made a sufficiently smaller resistance value than the resistance of the resistor 1203 of the control unit 300.

On the other hand, in the case of the base plate of the fixing device for maintenance 200B, the base plate has the NVRAM 1001 that is a nonvolatile memory as a memory unit. Information regarding a correction level of the fixing device for maintenance 200B is stored in the NVRAM 1001. Further, the NVRAM 1001 also has a function as an identification unit for identifying the fixing device 200. The NVRAM 1001 has a port for data communication, which is configured as the output terminal of an open collector. The port for data communication of the NVRAM 1001 is connected to the input/output port 1201 of the control unit 300 (FIG. 12B).

[Data Communication Mode and Identification Mode]

Next, a method by which the CPU 304 determines whether or not the fixing device 200 is the fixing device for maintenance 200B based on a signal input from the input/output port 1201, and a method by which the CPU 304 performs data communication with the NVRAM to obtain information regarding the correction level of the fixing device will be described.

First, a method by which the CPU 304 determines whether or not the fixing device 200 is the fixing device for maintenance 200B based on a signal level input to the input/output port 1201 is described. In this case, the CPU 304 assigns the input/output port 1201 as the input port. In a case where the fixing device 200 illustrated in FIG. 12A is the starter fixing device 200A, because the resistor 1202 is pull-down connected to the ground (GND), the voltage value of an input signal to the input/output port 1201 is a voltage obtained when the power supply voltage Vcc is divided by the resistor 1203 and the resistor 1202. At this time, because the resistor 1202 has a sufficiently smaller resistance value than the resistor 1203, a threshold value for a "high" level and a "low" level with respect to the CPU 304 can be satisfied. According to this configuration, in a case where a signal level input to the input/output port 1201 is the "low" level, it means that the fixing device 200 has the resistor 1202. Therefore, the CPU 304 determines that the fixing device 200 is the starter fixing device 200A.

On the other hand, in a case where the fixing device 200 illustrated in FIG. 12B is the fixing device for maintenance 200B, since the input/output port 1201 is connected to the output terminal of the open collector of the NVRAM 1001, and the port for data communication of the NVRAM 1001 is in an open state, the state is one in which the input/output port 1201 is pull-up connected to the power supply voltage Vcc through the resistor 1203. According to this configuration, in a case where the signal level at the input/output port 1201 is the "high" level, it means that the fixing device 200 has the NVRAM 1001. Therefore, the CPU 304 determines that the fixing device 200 is the fixing device for maintenance 200B.

Next, the method by which the CPU 304 performs data communication with the NVRAM to obtain information regarding a correction level of the fixing device will be described. In this case, it is necessary to determine in advance whether the fixing device 200 is the starter fixing device 200A or is the fixing device for maintenance 200B by the aforementioned method. If is it determined that the fixing device 200 is the starter fixing device 200A, the CPU 304 performs I2C communication with the NVRAM 302 as illustrated in FIG. 12A. Because information regarding the correction level of the starter fixing device 200A is stored in the NVRAM 302, control according to information corrected based on characteristics information of the starter fixing device 200A can be performed. On the other hand, if it is determined that the fixing device 200 is the fixing device for maintenance 200B, as illustrated in FIG. 12B, the CPU 304 assigns the input/output port 1201 as the input/output port, and performs I2C communication with the NVRAM 1001. Because information regarding the correction level of the fixing device for maintenance 200B is stored in the NVRAM 1001, control according to information corrected based on characteristics information of the fixing device for maintenance 200B can be performed.

[Control Sequence for Distinguishing Fixing Device]

Figure 13:
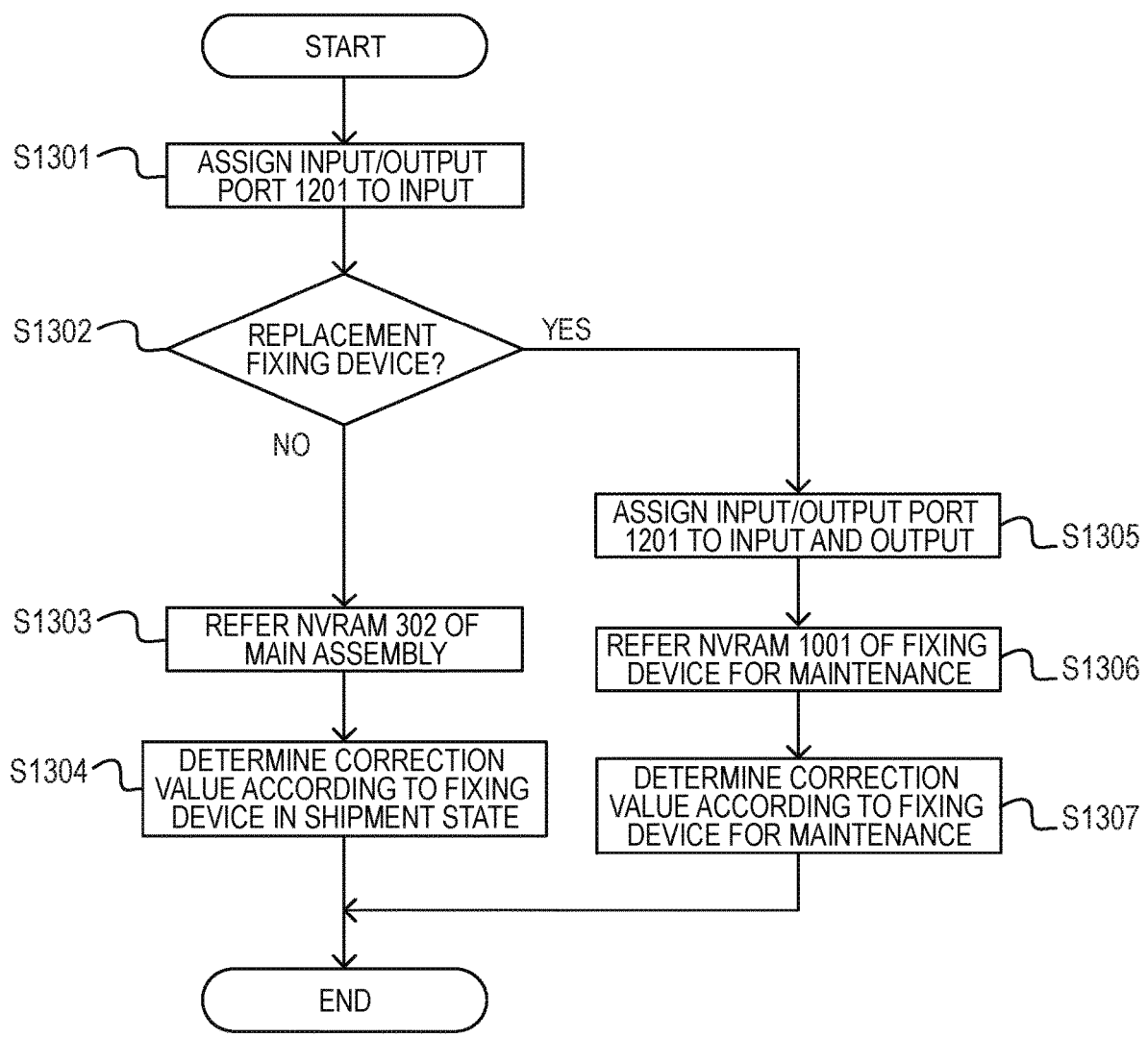
FIG. 13 is a flowchart illustrating a control sequence for distinguishing the fixing device of Embodiment 4.
Figure 14:
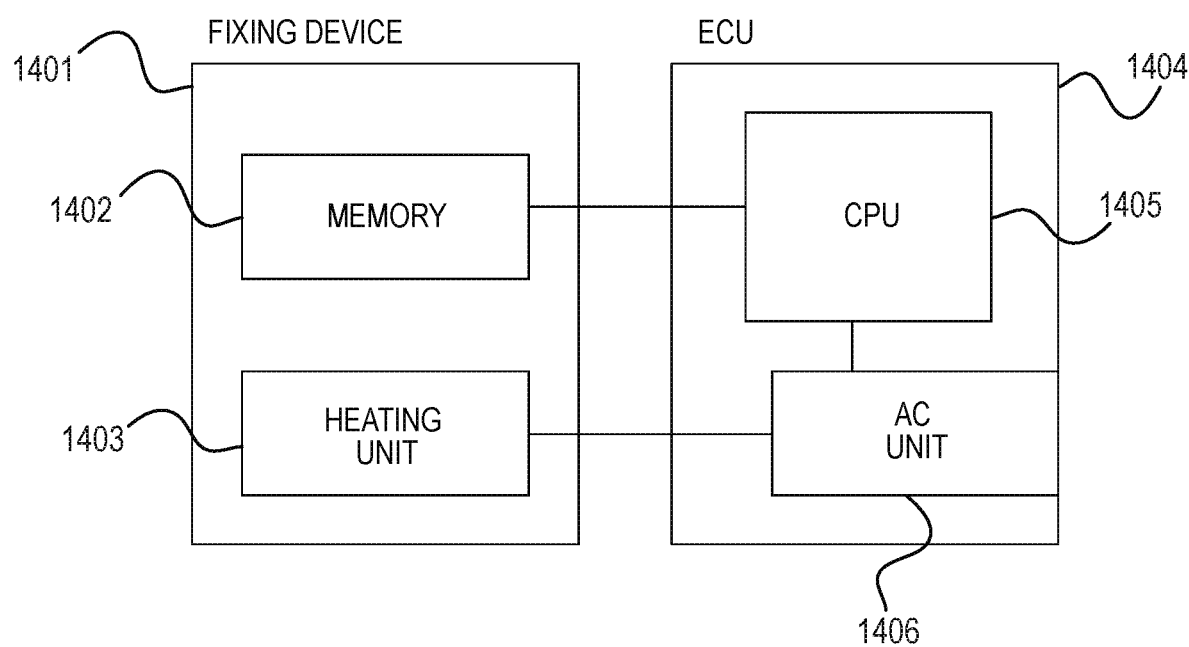
FIG. 14 is a block diagram for describing the configuration of a fixing device and an ECU of a conventional example.

FIG. 13 is a flowchart illustrating a control sequence for distinguishing whether the fixing device 200 mounted in the laser printer 118 is the starter fixing device 200A or is the fixing device for maintenance 200B. The processing illustrated in FIG. 13 is activated when the power of the laser printer 118 is turned on, and is executed by the CPU 304. Note that, it is assumed that a correction level of the starter fixing device 200A, and a table, in which correction levels of the starter fixing device 200A and correction values for the setting temperature of the heater 203 are associated, are stored in advance in the NVRAM 302 of the control unit 300. Further, it is assumed that a correction level of the fixing device for maintenance 200B is stored in advance in the NVRAM 1001.

In S1301, in order to determine whether or not the fixing device 200 mounted is the fixing device for maintenance 200B, the CPU 304 assigns the input/output port 1201 as the input port to thereby set the identification mode. In S1302 the CPU 304 determines whether or not the fixing device 200 is the fixing device for maintenance 200B based on an output signal from the fixing device 200 input to the input/output port 1201. If the output signal from the fixing device 200 input to the input/output port 1201 is the "high" level, the CPU 304 determines that the fixing device 200 is the fixing device for maintenance 200B, and advances the processing to S1305. On the other hand, if the output signal from the fixing device 200 input to the input/output port 1201 is the "low" level, the CPU 304 determines that the fixing device 200 is the starter fixing device 200A, and advances to the processing to S1303. In S1303, since the mounted fixing device 200 is the starter fixing device 200A, the CPU 304 assigns the NVRAM 302 mounted on the main assembly as the NVRAM to refer to in order to acquire the correction level of the starter fixing device 200A. Further, in S1304, the CPU 304 determines the corresponding correction value based on the table, in which correction levels and correction values are associated, that is stored in the NVRAM 302, and the correction level acquired from the NVRAM 302. In addition, the CPU 304 corrects the setting temperature of the heater 203 of the starter fixing device 200A based on the determined correction value, and then ends the processing.

On the other hand, in S1305, in order to perform communication with the NVRAM 1001 mounted in the fixing device for maintenance 200B, the CPU 304 assigns the input/output port 1201 as the input/output port. In S1306, the CPU 304 assigns the NVRAM 1001 mounted in the fixing device for maintenance as the NVRAM to refer to in order to acquire the correction level of the fixing device 200B. Next, in S1307, the CPU 304 determines the corresponding correction value based on the table, in which correction levels and correction values are associated, that is stored in the NVRAM 302, and the correction level acquired from the NVRAM 1001. In addition, the CPU 304 corrects the setting temperature of the heater 203 of the fixing device for maintenance 200B based on the determined correction value, and then ends the processing.

As described above, in the present embodiment, by using a signal line for communication with a memory mounted in the fixing device for maintenance 200B, a determination as to whether the fixing device 200 is the starter fixing device 200A or is the fixing device for maintenance 200B can be made without providing a dedicated signal line.

Note that, in the present embodiment, a case has been described in which communication is established with the NVRAM 1001 mounted in the fixing device for maintenance 200B. However, in a case where communication fails, temperature control of the heater of the fixing device for maintenance 200B may be performed using a setting temperature that is a default value acquired from the NVRAM 302.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-028164, filed Feb. 20, 2019, and Japanese Patent Application No. 2020-002728, filed Jan. 10, 2020, which are hereby incorporated by reference herein in their entirety.

What is claimed is:

1. An image forming apparatus configured to form an image on a sheet, the image forming apparatus comprising:
a main assembly of the image forming apparatus;
a replacement unit detachably mounted on the main assembly;
an identification unit mounted to the replacement unit and configured to be identified as to whether the replacement unit is a first unit mounted in advance in a shipment state of the image forming apparatus, or is a second unit after replacement;
a control unit mounted on the main assembly and configured to control the replacement unit mounted on the main assembly; and
a common signal line connected between the replacement unit and the control unit and configured to transmit a signal from the identification unit and another signal from the replacement unit to the control unit,
wherein the control unit is switchable between an identification mode which identifies whether the replacement unit is the first unit or the second unit according to the signal from the identification unit, and a normal operation mode in which the image forming apparatus performs a normal operation according to the another signal from the replacement unit through the common signal line,
wherein the control unit switches control information of the replacement unit mounted on the main assembly depending on whether the replacement unit identified in the identification mode is the first unit or is the second unit,
wherein the replacement unit includes a sheet detection unit configured to detect passage of a sheet,
wherein the another signal transmitted by the common signal line is a signal output by the sheet detection unit,
wherein the normal operation mode is a paper detection mode configured to detect passage of a sheet by the sheet detection unit,
wherein the main assembly includes a switch configured to disable detection of a sheet by the sheet detection unit, and
wherein when switching from the paper detection mode to the identification mode, the control unit controls the switch to disable the detection of a sheet by the sheet detection unit.

2. An image forming apparatus according to claim 1, further comprising a memory unit mounted on the main assembly,
wherein the memory unit stores the control information for the first unit, and
wherein in a case where the control unit identifies that the replacement unit is the first unit, the control unit performs control of the first unit based on the control information for the first unit acquired from the memory unit.

3. An image forming apparatus according to claim 2, wherein in a case where the control unit identifies that the replacement unit is the second unit, the control unit performs control of the second unit based on common control information for the second unit acquired from the memory unit.

4. An image forming apparatus according to claim 1, wherein in a case where the replacement unit is the first unit, the identification unit outputs a first signal,
wherein in a case where the replacement unit is the second unit, the identification unit outputs a second signal different from the first signal, and
wherein the sheet detection unit outputs the second signal in a case where the sheet detection unit detects a sheet, and outputs the first signal in a case where the sheet detection unit does not detect a sheet.

5. An image forming apparatus according to claim 1, wherein the replacement unit is a fixing device configured to fix an image transferred onto a sheet to the sheet, and
wherein the control information is temperature information of a heater configured to heat an image on the sheet.

6. An image forming apparatus according to claim 1, wherein the replacement unit is a transfer unit configured to transfer an image on an image bearing member onto the sheet,
wherein the transfer unit includes a conveyance roller and a transfer roller for transferring the image onto the sheet, and
wherein the control information includes information regarding a target speed for driving the conveyance roller to convey the sheet, and a voltage applied to the transfer roller.

7. An image forming apparatus according to claim 2, wherein the second unit includes a second memory unit, and
wherein in a case where the control unit identifies that the replacement unit is the second unit, the control unit performs control of the second unit based on control information for the second unit acquired from the second memory unit.

8. An image forming apparatus configured to form an image on a sheet, the image forming apparatus comprising:
a main assembly of the image forming apparatus;
a replacement unit detachably mounted on the main assembly, the replacement unit includes a sheet detection unit configured to detect passage of a sheet;
a control unit mounted on the main assembly and configured to control the replacement unit mounted on the main assembly; and
a common signal line connected between the replacement unit mounted on the main assembly and the control unit, the common signal line is a line configured to transmit an identification signal for identifying whether the replacement unit is a first unit or a second unit instead of the first unit and an another signal from the replacement unit to the control unit,
wherein the control unit switches a control of the replacement unit mounted on the main assembly depending on whether the replacement unit mounted on the main assembly is the first unit or the second unit,
wherein the control unit is switchable between an identification mode identifies whether the replacement unit mounted on the main assembly is the first unit or the second unit according to the identification signal through the common signal line and a paper detection mode for detecting passage of the sheet according to the another signal output by the sheet detection unit and transmitted through the common signal line,
wherein the main assembly includes a switch configured to disable detection of a sheet by the sheet detection unit; and
wherein when switching from the paper detection mode to the identification mode, the control unit controls the switch to disable the detection of a sheet by the sheet detection unit.

9. An image forming apparatus according to claim 8,
further comprising a memory unit mounted on the main assembly,
wherein the memory unit stores a control information for the first unit; and
wherein in a case where the control unit identifies that the replacement unit is the first unit, the control unit performs the control of the replacement unit based on the control information for the first unit acquired from the memory unit.

10. An image forming apparatus according to claim 9,
wherein in a case where the control unit identifies that the replacement unit is the second unit, the control unit performs the control of the replacement unit based on common control information for the second unit acquired from the memory unit.

11. An image forming apparatus according to claim 9,
wherein the second unit includes a second memory unit, and
wherein in a case where the control unit identifies that the replacement unit is the second unit, the control unit performs the control of the replacement unit based on a control information for the second unit acquired from the second memory unit.

12. An image forming apparatus according to claim 8,
wherein in a case where the replacement unit is the first unit, the replacement unit outputs a first signal;
wherein in a case where the replacement unit is the second unit, the replacement unit outputs a second signal different from the first signal; and
wherein the sheet detection unit outputs the second signal in a case where the sheet detection unit detects a sheet, and outputs the first signal in a case where the sheet detection unit does not detect a sheet.

13. An image forming apparatus according to claim 8,
wherein the replacement unit is a fixing device configured to fix an image transferred onto a sheet to the sheet; and
wherein the control information is an information according to setting temperature for fixing the image.

14. An image forming apparatus according to claim 8,
wherein the replacement unit is a transfer unit configured to transfer the image on an image bearing member onto the sheet,
wherein the transfer unit includes a conveyance roller and a transfer roller for transferring the image onto the sheet, and
wherein the control information includes information regarding a target speed for driving the conveyance roller to convey the sheet, and a voltage applied to the transfer roller.

15. An image forming apparatus according to claim 8,
wherein the first unit is a unit previously mounted on the main assembly in a shipment state of the image forming apparatus.

16. An image forming apparatus configured to form an image on a sheet, the image forming apparatus comprising:
a main assembly of the image forming apparatus;
a replacement unit detachably mounted on the main assembly, the replacement unit includes a sheet detection unit configured to detect passage of a sheet;
a control unit mounted on the main assembly and configured to control the replacement unit mounted on the main assembly; and
a common signal line connected between the replacement unit mounted on the main assembly and the control unit, the common signal line is a line configured to transmit an identification signal for identifying whether the replacement unit is a first unit or a second unit instead of the first unit and an another signal from the replacement unit to the control unit,
wherein the control unit switches a control of the replacement unit mounted on the main assembly depending on whether the replacement unit mounted on the main assembly is the first unit or the second unit,
wherein the control unit is switchable between an identification mode identifies whether the replacement unit mounted on the main assembly is the first unit or the second unit according to the identification signal through the common signal line and a paper detection mode for detecting passage of the sheet according to the another signal output by the sheet detection unit and transmitted through the common signal line,
wherein in a case where the replacement unit is the first unit, the replacement unit outputs a first signal;
wherein in a case where the replacement unit is the second unit, the replacement unit outputs a second signal different from the first signal; and
wherein the sheet detection unit outputs the second signal in a case where the sheet detection unit detects a sheet, and outputs the first signal in a case where the sheet detection unit does not detect a sheet.

17. An image forming apparatus according to claim 16,
wherein the replacement unit is a fixing device configured to fix an image transferred onto a sheet to the sheet; and
wherein the control information is an information according to setting temperature for fixing the image.

18. An image forming apparatus according to claim 16,
wherein the replacement unit is a transfer unit configured to transfer the image on an image bearing member onto the sheet,
wherein the transfer unit includes a conveyance roller and a transfer roller for transferring the image onto the sheet, and
wherein the control information includes information regarding a target speed for driving the conveyance roller to convey the sheet, and a voltage applied to the transfer roller.

* * * * *